US00RE44554E

(19) United States
(12) Reissued Patent
Utsumi et al.

(10) Patent Number: US RE44,554 E
(45) Date of Reissued Patent: Oct. 22, 2013

(54) INFORMATION RECEIVING DEVICE AND METHOD, INFORMATION RELEASE DEVICE, AND INFORMATION COMMUNICATION SYSTEM

(75) Inventors: Shusuke Utsumi, Minato-ku (JP); Ryusuke Sawatari, Minato-ku (JP)

(73) Assignee: Sony Corporation, Tokyo (JP)

(21) Appl. No.: 12/378,772

(22) Filed: Feb. 18, 2009

Related U.S. Patent Documents

Reissue of:
(64) Patent No.: 6,693,896
Issued: Feb. 17, 2004
Appl. No.: 09/446,994
PCT Filed: May 13, 1999
PCT No.: PCT/JP99/02493
§ 371 (c)(1),
(2), (4) Date: Apr. 7, 2000
PCT Pub. No.: WO99/59295
PCT Pub. Date: Nov. 18, 1999

U.S. Applications:
(62) Division of application No. 11/356,422, filed on Feb. 16, 2006.

(30) Foreign Application Priority Data

May 13, 1998 (JP) ..... P10-129971

(51) Int. Cl.
*H04L 12/66* (2006.01)

(52) U.S. Cl.
USPC ..... 370/352

(58) Field of Classification Search
None
See application file for complete search history.

(56) References Cited

U.S. PATENT DOCUMENTS 5,757,798 A 5/1998 Hamaguichi
5,930,473 A * 7/1999 Teng et al. ..... 709/204
5,963,547 A * 10/1999 O'Neil et al. ..... 370/260
5,991,811 A * 11/1999 Ueno et al. ..... 709/231
6,032,180 A * 2/2000 Nishikawa ..... 725/115
6,094,431 A * 7/2000 Yamato et al. ..... 370/395.21
6,167,025 A * 12/2000 Hsing et al. ..... 370/216
6,170,014 B1 * 1/2001 Darago et al. ..... 709/229
6,349,324 B1 * 2/2002 Tokoro ..... 709/200
6,438,596 B1 * 8/2002 Ueno et al. ..... 709/226
6,493,876 B1 * 12/2002 DeFreese et al. ..... 725/100
6,606,664 B2 * 8/2003 Darago et al. ..... 709/229
6,693,896 B1 * 2/2004 Utsumi et al. ..... 370/352
2002/0057694 A1 * 5/2002 Kamo ..... 370/395.2

FOREIGN PATENT DOCUMENTS

JP 6-30021 2/1996
JP 9-1211337 5/1997
JP 08-032601 8/2008

OTHER PUBLICATIONS

US PUB 2002/0064149, Elliott et al. May 30, 2002, system and method for providing requested QoS in a hybrid network.*
US PUB 2003/0140159, Campbell, Jul. 24, 2003, method and system for transmitting and/or retrieving real-time video and audio information over performance-limited transmission systems.*
Partridge, Craig Gigabit Networking Chapter 11 Traffic Shapping, 00-00-1994.

* cited by examiner

*Primary Examiner* — Raj Jain
(74) *Attorney, Agent, or Firm* — Oblon, Spivak, McClelland, Maier & Neustadt, L.L.P.

(57) ABSTRACT

If an instruction is provided so as to receive second content information in place of first content information on the basis of only one operation by a user while the first content information is received through a connection formed in a communication network, the connection for communication of the first content information is disconnected, and thereafter, a connection for communication of the second content information is formed. In this manner, network resources can be reserved or released without consciousness of users.

9 Claims, 19 Drawing Sheets

54A

| | |
|---|---|
| SERVICE NUMBER : | 1 |
| PROGRAM TITLE : | SPORT "BASEBALL 1" |
| SERVER ADDRESS : | aaa.bbb.cc.dd |
| PORT NUMBER : | 10000 |
| TRANSFER RATE : | 6Mbps |
| READ/WRITE SIZE FOR SOCKET : | 8192B |
| SOCKET BUFFER SIZE : | 50KB |
| MAXIMUM/MINIMUM TRANSFER SIZE : | 8192 / 0 |
| TOKEN PACKET SIZE : | 16KB |
| MULTICAST IP ADDRESS/PORT NUMBER : | 0 / 0 |
| SERVICE NUMBER : | 2 |
| PROGRAM TITLE : | SPORT "BASEBALL 2" |
| SERVER ADDRESS : | aaa.bbb.cc.dd |
| PORT NUMBER : | 10002 |
| TRANSFER RATE : | 3Mbps |
| READ/WRITE SIZE FOR SOCKET : | 8192B |
| SOCKET BUFFER SIZE : | 50KB |
| MAXIMUM/MINIMUM TRANSFER SIZE : | 8192 / 0 |
| TOKEN PACKET SIZE : | 16KB |
| MULTICAST IP ADDRESS/PORT NUMBER : | 0 / 0 |

| | |
|---|---|
| SERVICE NUMBER : | 9 |
| PROGRAM TITLE : | CINEMA "CINEMA 2" |
| SERVER ADDRESS : | aaa.bbb.cc.dd |
| PORT NUMBER : | 10002 |
| TRANSFER RATE : | 3Mbps |
| READ/WRITE SIZE FOR SOCKET : | 8192B |
| SOCKET BUFFER SIZE : | 50KB |
| MAXIMUM/MINIMUM TRANSFER SIZE : | 8192 / 0 |
| TOKEN PACKET SIZE : | 16KB |
| MULTICAST IP ADDRESS/PORT NUMBER : | 224. 1. 1. 1/10002 |

FIG.5

INFORMATION RECEIVING DEVICE AND METHOD, INFORMATION RELEASE DEVICE, AND INFORMATION COMMUNICATION SYSTEM

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue divisional of and claims the benefit of priority from U.S. Ser. No. 11/356,422, filed Feb. 16, 2006, which is an application for reissue of Ser. No. 09/446,994, filed Apr. 7, 2000, now U.S. Pat. No. 6,693,896, which is a national stage application of PCT/JP99/02493, filed May 13, 1999, now abandoned, and claims the benefit of priority from Japanese Patent Application No. 10-129971, filed May 13, 1998, the entire contents of each of which are incorporated herein by reference.*

TECHNICAL FIELD

The present invention relates to an information receiving apparatus, an information receiving method, an information providing apparatus, and an information communication system, by which a user can reserve or release a resource without consciousness.

BACKGROUND ART

It is considered that users can use a high-speed network in homes in the near future, for example, owing to progress of FTTH (Fiber to the Home) techniques which provides various communication services such as telephone, ISDN, and the like through optical fiber cables extended to homes. In case of realizing data providing services which are expected to spread under this environment, such as Internet television service (which will be abbreviated as Internet TV hereinafter), Internet video on demand service (which will be abbreviated as Internet VoD), and the like, the service providers must guarantee the quality of data provided for users, i.e., the quality of services (QoS). In order to guarantee the quality in the data providing services, reservations of band resources used on the network must be carried out to achieve data providing services. That is, to explain an IP (Internet Protocol) network using an ATM (Asynchronous Transfer Mode), a connectionless IP packet needs to be transferred by a virtual connection (which will be abbreviated as VC hereinafter) as a connection-oriented technique which guarantees the quality.

Meanwhile, RSVP (Resource reSerVation Protocol) has been conventionally known as a protocol for reserving a resource such as virtual connection (VC) or the like. In the RSVP, a user operates a terminal connected to a network to reserve a resource, and a connection is thereby constructed. In this manner, the user can obtain data providing services. Also, in the RSVP, after a data providing service is obtained, the resource needs to be released when the user operates the terminal again and the connection needs to be cut.

Thus, in a conventional protocol such as RSVP for reserving a resource, a user himself or herself must operate a terminal, for example, to reserve or release a resource. Thus, there is a problem that users must carry burdens.

Also, for example, in case of an Internet TV, broadcasting of programs is expected to be supplied through a plurality of channels. In the data providing service (program broadcasting service) by the internet TV, it is considered that a user will switch channels to know what programs are being broadcasted, like watching and hearing a normal television broadcasting program, i.e., a user will frequently switch channels for zapping. In this case, however, the user must operate a terminal to reserve or release a resource every time zapping is carried out, so that this operation will become a large burden for the user.

The present invention has been made in view of this situation, and has an object of providing an information receiving apparatus, an information receiving method, an information providing apparatus, and an information communication system, by which users can reserve or release resources without particular consciousness.

DISCLOSURE OF THE INVENTION

An information receiving apparatus according to the present invention, which is connected to an information providing apparatus by forming a connection in a communication network and which receives content information from the information providing apparatus through the connection, comprises: input means for inputting a command based on an operation by a user; communication means for making communication through the communication network; control means for controlling the communication means so as to output an instruction signal, based on the command inputted through the input means; and display means for displaying the content information received by the communication means, characterized in that if a switching instruction which indicates that second content information should be received in place of first content information is inputted as the command to the communication means when the communication means is receiving the first content information through the connection formed in the communication network, the control means makes control so as to output a disconnection instruction for disconnecting the connection for transmitting the first content information, which is formed in the communication network connecting the communication means and the information providing apparatus, and a formation instruction for forming the connection for transmitting the second content information, which is formed in the communication network connecting the communication means and the information providing apparatus.

The control means of the information receiving apparatus according to the present invention controls makes control such that the communication means outputs a reservation instruction signal for making reservation of a communication band resource of the communication network, as the instruction signal, prior to formation of the connection.

Also, if the control means of the information receiving apparatus according to the present invention recognizes the communication band resource which is necessary for the content information to be received, the control means makes control such that the communication means outputs the reservation instruction signal containing resource information indicating the communication band resource, or if the control means does not recognize the communication band resource which is necessary for the content information to be received, the control means makes control such that the communication means outputs the reservation instruction signal without containing the resource information indicating the communication band resource.

Also, the information receiving apparatus according to the present invention further comprises storage means for storing predetermined resource information used for reserving a communication band resource necessary for transmitting the content information, characterized in that the control means generates the formation instruction containing the predetermined resource information stored in the storage means, when forming the connection.

Also, the information receiving apparatus according to the present invention is characterized in that the storage means stores information used for reserving a communication band resource for transmitting the content information to be provided at least in a one-to-one manner or a one-to-many manner, as the predetermined resource information.

Also, the information receiving apparatus according to the present invention is characterized in that after outputting the disconnection instruction for instructing disconnection of the connection for content information presently received at a previously set time interval, the control means makes control so as to output the formation instruction for instructing formation of the connection for transmitting content information according to a previously set order.

Next, an information receiving method according to the present invention, in which a connection is made in a communication network to an information providing apparatus and content information is received from the information providing apparatus through the connection, comprises: an input step of inputting a command based on an operation by a user; a communication step of making communication through the communication network; a control step of controlling the communication step so as to output an instruction signal, based on the command inputted through the input step; and a display step of displaying the content information received through the communication step, characterized in that if a switching command which instructs that second content information should be received in place of first content information is inputted as the command in the communication step, based on only one operation by a user in the input step, when the first content information is being received in the communication step through the connection formed in the communication network, the control step makes control so as to output a disconnection instruction for instructing disconnection of the connection for transmitting the first content information, which is formed in the communication network connected with the information providing apparatus by the communication step, and a formation instruction for instructing formation of the connection for transmitting the second content information, which is formed in the communication network connected with the information providing apparatus in the communication step.

The control step of the information receiving method according to the present invention makes control such that a reservation instruction signal for making reservation of a communication band resource of the communication network is outputted as the instruction signal in the communication step, prior to formation of the connection.

Also, if the communication band resource which is necessary for the content information to be received is recognized in the control step, the control step of the information receiving method according to the present invention makes control such that the reservation instruction signal containing resource information indicating the communication band resource is outputted in the communication step, or if the communication band resource which is necessary for the content information to be received is not recognized in the control step, the control step makes control such that the reservation instruction signal without containing resource information indicating the communication band resource is outputted in the communication step.

Also, the information receiving method according to the present invention further comprises a storage step of storing predetermined resource information used for reserving a communication band resource necessary for transmitting the content information, characterized in that the control step generates the formation instruction containing the predetermined resource information stored in the storage step, when forming the connection.

Also, information used for reserving a communication band resource for transmitting the content information to be provided at least in a one-to-one manner or a one-to-many manner is stored as the predetermined resource information in the storage step of the information receiving method according to the present invention.

Also, after outputting the disconnection instruction for instructing disconnection of the connection for content information presently received, at a previously set time interval, the control step of the information receiving method according to the present invention makes control so as to output the formation instruction for instructing formation of the connection for transmitting content information according to a previously set order.

Next, an information providing apparatus according to the present invention, which is connected to an information receiving apparatus through a communication network and which provides the information receiving apparatus with content information with use of a communication band resource of the communication network which is reserved prior to providing of the content information, comprises: communication means for making communication through the communication network; storage means for storing the content information; detection means for detecting whether or not resource information indicating the communication band resource is contained in an instruction signal, when the communication means receives the instruction signal from the information receiving apparatus; and control means for outputting a band reservation command for reserving the communication band resource, based on a detection result from the detection means, and for making control to make a selection from a first mode in which the communication means is controlled so as to output the content information to the information receiving apparatus, and a second mode in which the communication means is controlled so as to output the content information with use of the communication band resource indicated by the resource information, characterized in that the control means selects the first mode if the instruction signal does not contain the resource information, or the second mode if the instruction signal contains the resource information.

An information communication system according to the present invention comprises an information providing apparatus and an information receiving apparatus connected to a communication network, in which the information providing apparatus and the information receiving apparatus exchanges content information through communication with use of a communication band resource of the communication network which is reserved prior to communication of the content information, characterized in that the information providing apparatus includes providing communication means for making communication through the communication network, storage means for storing the content information, and providing control means for controlling the providing communication means so as to output the content information, that the information receiving apparatus includes input means for inputting a command based on an operation by a user, receiving communication means for making communication through the communication network, receiving control means for controlling the receiving communication means so as to output an instruction signal based on the command inputted through the input means, and display means for displaying the content information received by the receiving communication means, and that if a switching instruction which indicates that second content information should be received in place of first content information is inputted as the command to the receiving communication means when the receiving communication means is receiving the first content information through the connection formed in the communication network, the receiving control means makes control so as to output a disconnection instruction for disconnecting the connection for transmitting the first content information, which is formed in the communication network connecting the receiving communication means and the information providing apparatus, and a formation instruction for forming the connection for transmitting the second content information, which is formed in the communication network connecting the receiving communication means and the information providing apparatus.

The information providing apparatus in the information communication system according to the present invention further includes detection means for detecting whether or not resource information indicating the communication band resource is contained in an instruction signal, when the receiving communication means receives the instruction signal from the information receiving apparatus, and based on a detection result from the detection means, the providing control means makes control so as to select a first mode in which a band reservation command for reserving the communication band resource is outputted and the communication means is controlled so as to output the content information to the information receiving apparatus, if the instruction signal does not contain the resource information, or a second mode in which the communication means is controlled so as to output the content information with use of the communication band resource indicated by the resource information, if the instruction signal contains the resource information.

Also, the information communication system according to the present invention further comprises a relay apparatus between the information providing apparatus and the information receiving apparatus, characterized in that the relay apparatus reserves the band communication resource based on an instruction from the providing control means and the receiving control means.

Also, the relay apparatus in the information communication system according to the present invention reserves the communication resource used for communication from the information providing apparatus to the information receiving apparatus.

BRIEF DESCRIPTION OF THE DRAWINGS

FIG. 5 shows an example of data (resource reservation parameters) set in a client setting file.

BEST MODE FOR CARRYING OUT THE INVENTION

In the following, explanation will be made of preferred embodiments of the present invention with reference to the drawings.

Figure 1:
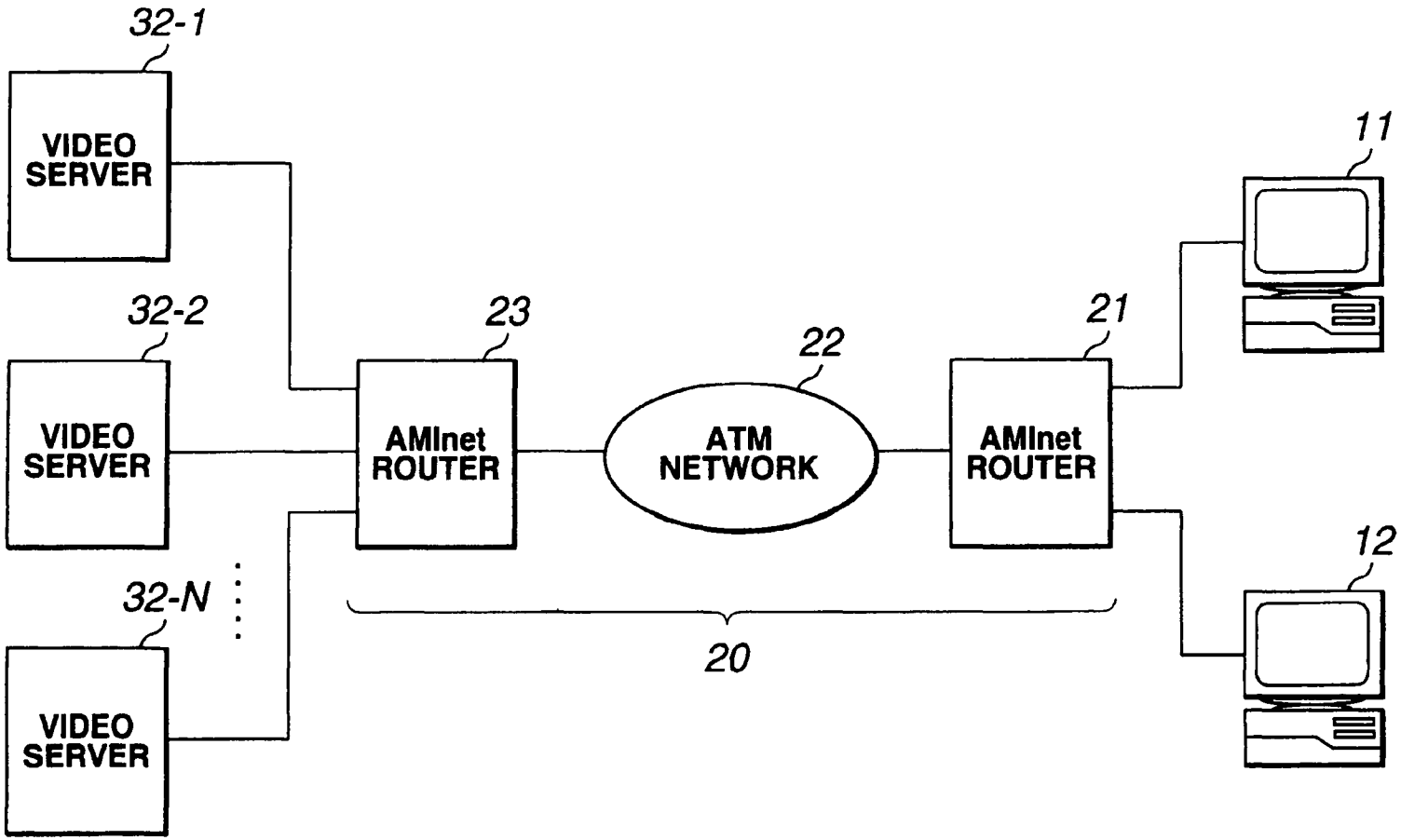
FIG. 1 is a view showing an example of the structure of a network of client terminals to which the present invention is applied.

FIG. 1 shows an example of a connection of a network of a client terminal to which the present invention is applied.

Client terminals 11 and 12 are each comprised of a personal computer used by a member and are connected to a router through channels. Although only two terminals 11 and 12 are shown in the example shown in FIG. 1, this is merely an example and a plurality of terminals may be connected to the router. In the following explanation, channels using optical fibers are cited as examples of channels connected to the client terminals 11 and 12 (which will be called member lines). Also, in the following explanation, a network called AMInet described later is used as an example of the network connected to the channels using the optical fibers. The client terminals 11 and 12 connected to an AMInet router 21 of the AMInet 20 through member lines.

In this case, the AMInet is a network which is compatible as a host with the Internet and is also a network architecture of a next generation which solves problems of existing network architectures. The AMInet architecture solves essential problems included in the Internet architecture, in view of the generation in which homes and enterprises will be always connected to an ultra-high-speed network of a symmetric/semi-symmetric type by realizing FTTH (T. Miki. Toward the Service-Rich Era. IEEE Communications Magazine, Vol. 32, No. 2, February 1994) and xDSL (G. T. Hawley. Systems Considerations for the Use of xDSL Technology for Data Access. IEEE Communications Magazine, Vol. 35, No. 3, March 1997).

That is, the AMInet architecture is characterized in realization of dynamic construction of an optimum protocol stack, original high-speed resource reservation using IP, negotiation between equal classes of different nodes and between upper and lower classes in one same node, connection-oriented QoS guarantee, separation of an ID of a node and an address thereof, control between non-ends, an architecture independent from communication media, and the like. Note that the high-speed resource reservation protocol in the AMInet will now be called ASP (AMInet Set-up Protocol). The AMInet and ASP will be more specifically explained below.

The AMInet 20 is constructed by an AMInet router 21, an ATM network 22 (which is merely an example and may be another network), and an AMInet router 23.

The AMInet router 21 forming part of the AMInet 20 is a router having an ATM network interface which has original function expanded for the AMInet. This AMInet router 21 collects member lines and is connected to the ATM network 22 as an example of a channel network. The ATM network 22 is connected also to the AMInet router 23 in addition to the AMInet router 21. The AMInet router 23 is also a router having an ATM network interface which has original function expanded for the AMInet, like the AMInet router 21. In this example, the AMInet router 23 is connected to N pieces of servers through optical fibers. In FIG. 1, video servers 32-1 to 32-N each of which is capable of providing video data and audio data are cited as examples of N pieces of servers. In the following, the video servers 32-1 to 32-N will be represented simply by a video server 32 unless the servers need to be distinguished from each other.

The video server 32 is, for example a video server capable compatible with Internet TV and Internet VoD, and can supply (or supply services of providing) at least video data and audio data to client terminals 11 and 12.

Figure 2:
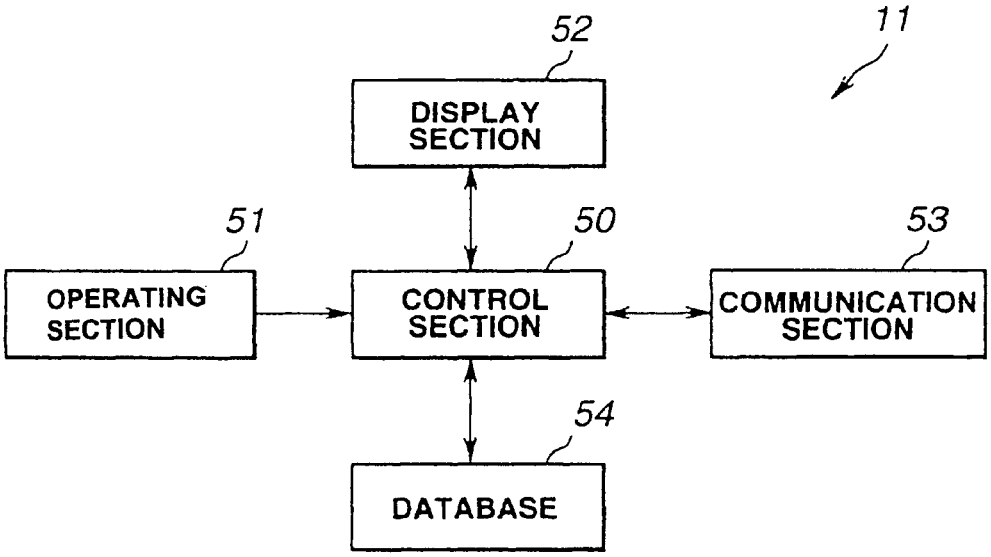
FIG. 2 is a view showing an example of the structure inside a client terminal.

FIG. 2 shows an example of an internal structure of the client terminal 11.

An operating section 51 is constructed by a mouse or a keyboard, for example, and is operated appropriately by a user when inputting a predetermined command to the control section 50. A display section 52 is constructed by, for example, an LCD (Liquid Crystal Display), a CRT (Cathode Ray Tube), or another display device and displays various information.

A communication section 53 is connected to the AMInet router 21 through a member line to make communication with the AMInet router 21. A data base 54 stores a client interface (hereinafter abbreviated as I/F) program capable of responding to Internet TV and Internet VoD, predetermined data necessary for the client I/F, and an application program necessary for the communication section 53 to make communication through the AMInet 20. Further, the database 54 appropriately stores data provided through the AMInet 20. Note that the predetermined data required for the Internet TV and internet VoD will be resource reservation parameters and the like which are required for reserving network band resources when receiving providing services concerning various data such as video data, audio data, and the like from a server. These resource reservation parameters are distributed from the server side and stored into the database 54 when a connection is made with a server as a service provider, for example. In addition, the resource reservation parameters can be previously supplied in form of any medium. In this case, resource reservation parameters picked up from the supplied medium are stored into the database 54. Details of the resource reservation parameters will be described later.

The control section 50 controls the operating section 51 to the database 54 in accordance with the client I/F program and application program stored in the database 54, so as to execute various operations.

Note that the inside of the client terminal 12 is constructed to be basically equal to the client terminal 11 and its illustration and explanation will be omitted herefrom.

Figure 3:
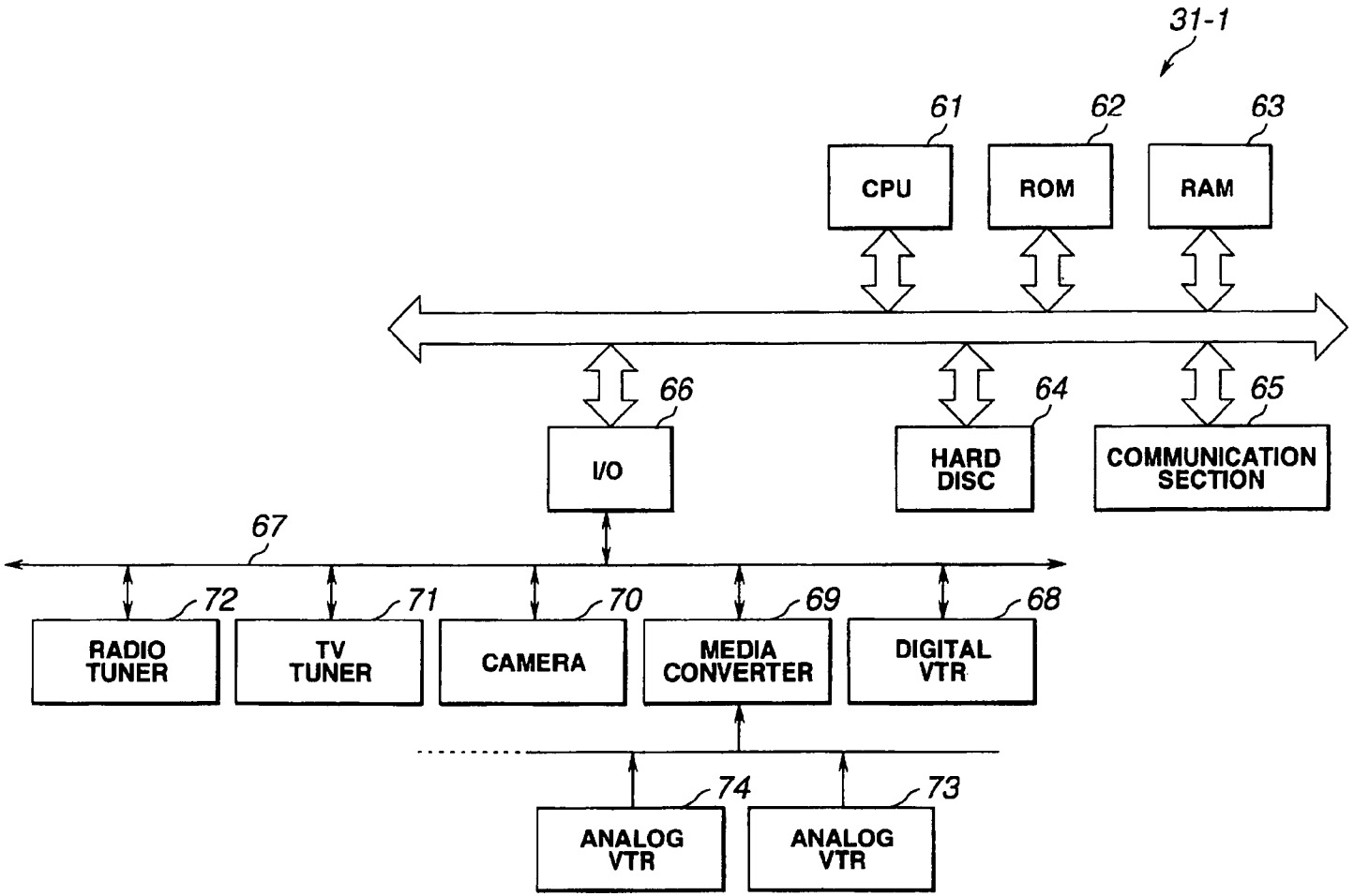
FIG. 3 is a view showing an example of the structure inside a video server.

FIG. 3 shows an example of the structure of the video server 32-1.

A CPU 61 is arranged so as to execute various operations in accordance with a program recorded in a ROM 62 or a hard disk 64. The RAM 63 appropriately stores various data necessary for the CPU 61 to execute various processing.

The hard disk 64 stores a server program for responding to predetermined requests transferred through the AMInet 20 and also stores a client I/F program to be provided for a client terminal and data (e.g., resource reservation parameters) necessary for the program. Further, the hard disk 64 is capable of storing data (e.g., video data and audio data) to be provided as a service for a member (or client terminal).

Video data and audio data to be provided as service data for a client terminal are supplied from the hard disk 64 or various devices connected through the I/O section 66. The video data or audio data supplied from those various devices is transmitted directly from the communication section 65 to the AMInet 20 in response to the client terminal side or is once stored into the hard disk 64 from which the data is read in response to a request from the client terminal side and is transmitted from the communication section 65 to the AMInet 20.

The I/O section 66 is connected to, for example, an IEEE 1394 network 67, and the IEEE 1394 network 67 is connected to, for example, a digital VTR 68, a media converter 69, a television camera 70, a TV tuner 71, a radio tuner 72, and the like, as supply sources for supplying video data and audio data to be provided as service data for a client terminal. In addition, the media converter 69 is connected to, for example, a plurality of analogue VTRs 73, 74, . . . This media converter 69 converts analogue videos and audio signals, from the analogue VTRs, into digital videos and audio data, and supplies the converted digital vides and audio data onto the IEEE 1394 network 67. That is, the data to be supplied from the server side to the client terminal side is not limited to recorded video data but may be considered to be live video data being currently picked up by the television camera 70, videos and audio data processed through the media converter 69, and the like. Note that video data to be transmitted may be, for example, in form of compressed image data according to the MPEG standard.

The communication section 65 is connected to the AMInet router 23 through an optical fiber so as to make communication with the AMInet router 23.

The insides of the video servers 32-2 to 32-N are constructed to be basically equal to the inside of the video server 32-1, and illustration and explanation thereof will be omitted herefrom.

By the structure described above, a client terminal can receive services for providing video data and audio data based on the Internet TV or Internet VoD from a video server. In the following, explanation will be made of a processing procedure in case where a client terminal of receiving a service of providing video data and audio data through the Internet TV or Internet VoD from a video server.

Figure 4:
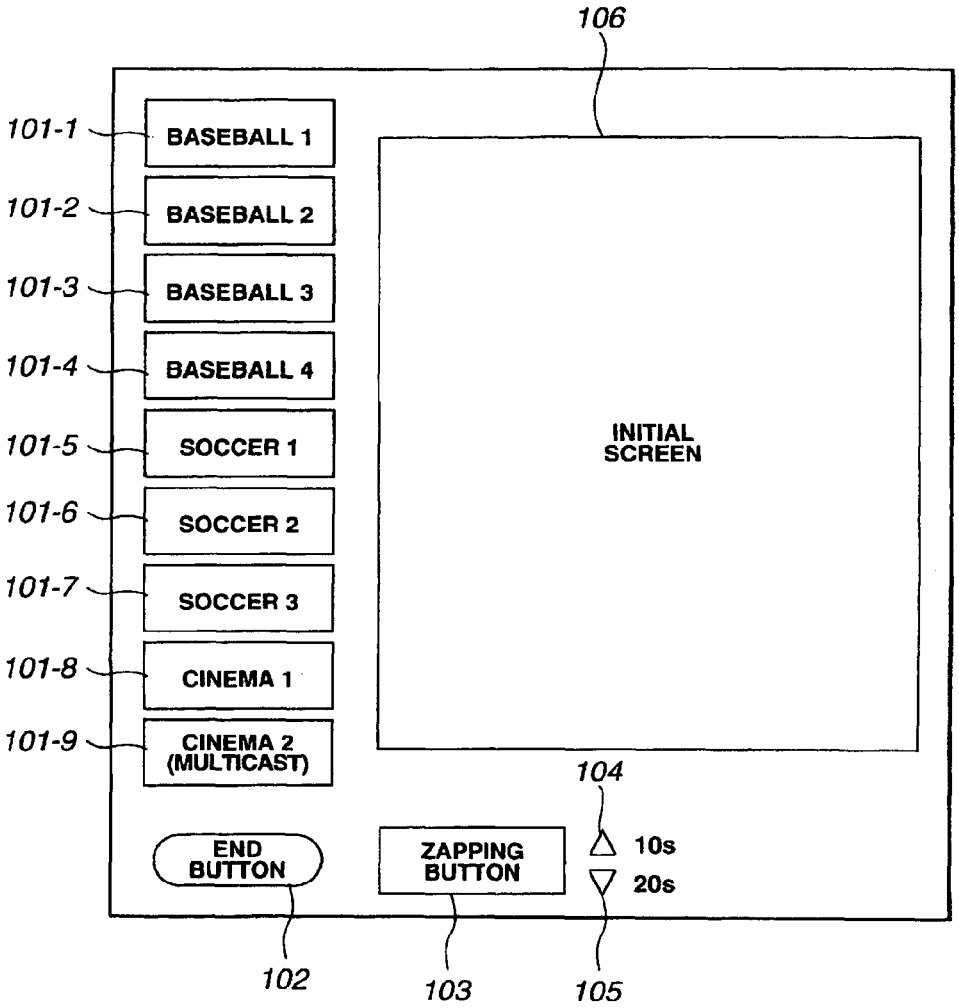
FIG. 4 is a display example of the screen of the client I/F.

FIG. 4 shows a display example of an initial screen of a client I/D displayed as GUI (Graphical User Interface) on the screen of the display section 52 of the client terminal 11.

In the example of FIG. 4, program selection buttons 101-1 to 101-9 indicating a plurality of program titles as contents to be provided by services are arranged in the left side on the screen of the display section 52. Below the program selection button 101-9, an end button 102, a zapping button 103, 10 s setting button, and 20 s setting button 105 are provided. A video display section 106 is positioned at the center in the right side on the screen.

In this example, the client I/F is an example of I/F compatibly responding to the Internet TV and Internet VoD. In the case of FIG. 4, service names (program titles) which can be provided by the Internet VoD are indicated on the program selection buttons 101-1 to 101-8, and the program selection button 101-9 indicates a service name (program title) which can be provided by the Internet TV.

FIG. 5 shows examples of resource reservation parameters as predetermined data necessary for the client I/F compatible with the Internet TV and Internet VoD. These resource reservation parameters are required for network resource reservation when receiving information concerning respective programs to be provided through the Internet TV and Internet VoD. For example, when a client terminal makes a connection with a server in the service providing side, the parameters are transmitted from the server side and stored as a client setting file 54A in the database 54 of the client terminal.

In the example of FIG. 5, set as resource reservation parameters are a service number for specifying the content of a service, a program title which can be provided as a service, a server address such as a broadcasting station address of Internet TV or Internet VoD (e.g., an IP address of a network layer), a port number which specifies a service in a server (e.g., a TCP/UDP port number of a transport layer), a transfer rate for specifying a band resource required on a network when providing a service, a read/write size with respect to a socket as a unit of data read/written from/into OS (operating system) by an application of a serve, a socket buffer size as the size of a buffer for a socket, maximum and minimum transfer sizes of data (in units of bytes) transferred on the network, a token packet size as one of parameters in a so-called token packet algorithm (e.g., the maximum data amount which can be outputted at once onto the network), and a multicast IP address and port number which are used for executing multicast providing.

In case of Internet VoD, since one service (video data and audio data of a program) is supplied for one client terminal, the service (video data and audio data of a program) is supplied in form of uni-cast from a server. Accordingly, in this case, the multicast IP-address/port-number of the resource reservation parameters shown in FIG. 5 is neglected (e.g., set to 0/0). Also, in the Internet VoD, if provided video data is, for example, animation data and if the animation data matches with the MPEG standard, a user (or client terminal) can select a desired transfer rate from several kinds of transfer rates such as 6M bps, 3M bps, and the like, as the transfer rate for the animation data.

Meanwhile, in case of Internet TV, a plurality of client terminals exist with respect to one service (program), and therefore, the service (program) is provided in form of multicast from a server.

Returning to FIG. 4, program titles among resource reservation parameters are displayed on the program selection buttons 101. Accordingly, a user (or client terminal) selects a button displaying a desired program title from the program selection buttons 101 and can then receives a service of video data and audio data corresponding to the selected program through the Internet TV or Internet VoD.

The end button 102 is a button which is selected when a user terminates a client I/F.

The zapping button 103 is operated by a user when the zapping mode is set on or off. If the zapping mode is set on, a plurality of videos corresponding to the program selection buttons 101 are automatically and sequentially displayed on the image display section 106 for a predetermined time (e.g., 10 or 20 seconds in this example). In this manner, the user can confirm videos of respective programs so that an interested program can be found out with ease.

The 10 s setting button 104 is selected by a user when the display time (zapping time) for which respective programs are displayed automatically and sequentially is set to 10 seconds while the zapping mode is on. The 20 s setting button 105 is selected by a user when the display time (zapping time) for which respective programs are displayed automatically and sequentially is set to 20 seconds while the zapping mode is on.

When an initial screen is displayed on the display section 52, i.e., when the client I/F program is newly started, predetermined settings of the client I/F are initialized. For example, when the zapping mode is switched on, the zapping time is initialized to either 10 or 20 seconds.

Figure 6:
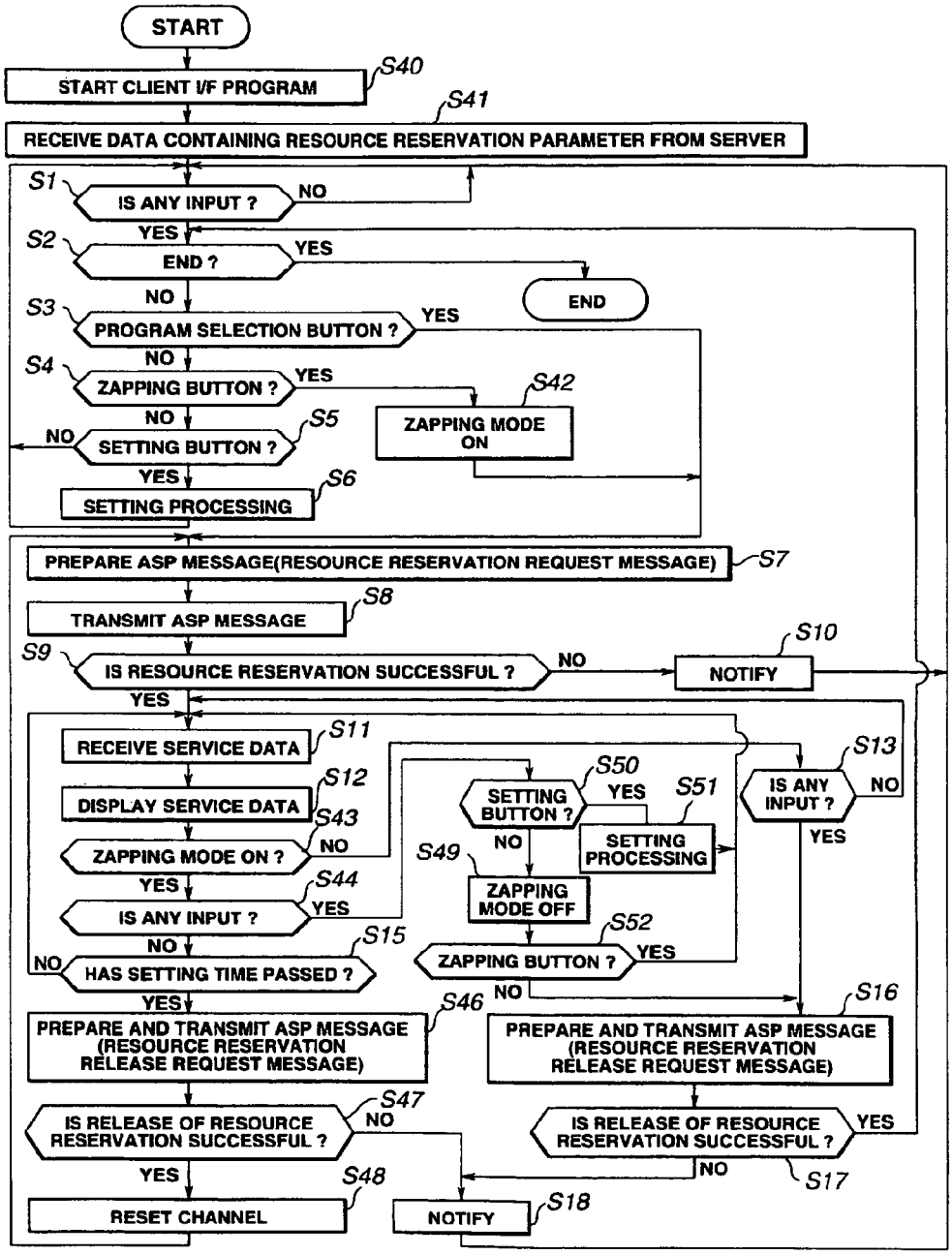
FIG. 6 is a flowchart which explains an operation example of a client terminal.

Next, FIG. 6 shows a processing procedure in the control section 50 of the client terminal 11 in case where a service of Internet TV or Internet VoD is received from a server.

In this FIG. 6, when the client I/F program is started in the step S40, the control section 50 controls the communication section 53 to make connection with a server and to receive and store data containing resource reservation parameters into the data base 54, for example, in the step S41. Then, the initial screen of the client I/F shown in FIG. 4 is displayed on the display section 52.

In a state in which the client I/F program is started and the initial screen of the client I/F shown in FIG. 4 is displayed on the display section 52, the control section 50 waits in the step S1 until any command is inputted through the operating section. The control section 50 goes to the processing of the step S2 and later if any command is inputted through the operating section 51 while waiting in the step S1.

In the step S2, the control section 50 determines whether or not a command inputted through the operating section 51 in the step S1 instructs end of the client I/F. The control section 50 executes termination processing of the client I/F program if it is determined by the determination processing in the step S2 that an end command is inputted, i.e., if the operating section 51 is operated by a user to select the end button 102.

The control section 50 goes to the processing of the step S3 if it is determined by the determination processing in the step S2 that a command inputted through the operating section 51 does not instruct end of the client I/D. The control section 50 determines whether or not the command inputted through the operating section 51 is an operation command concerning the program selection buttons 101. If it is determined that the command is not an operation command concerning the program selection buttons 101, the control section 50 goes to the processing in the step S4.

The control section 50 goes to the processing in the step S4 and then determines whether or not the command inputted through the operating section 51 in the step S1 is an operation command concerning the zapping button 103. If it is determined that the command is not an operation command concerning the zapping button 103, the control section 50 goes to the processing in the step S5. The control section 50 thus goes to the processing in the step S5 and then determines whether or not the command inputted through the operating section 51 is an operation command concerning the 10s setting button 104 or the 20 s setting button 105.

If the control section 50 determines that the command inputted through the operating section 51 in the step S1 is not an operation command concerning the 10s setting button 104 or the 20 s setting button 105, the control section 50 returns to the processing in the step S1 and waits until a command is inputted from the operating section 51. Otherwise, in the processing in the step S5, if the control section 50 determines that the command inputted through the operating section 51 in the step S1 is an operation command which has selected either the 10 s setting button 104 or the 20 s setting button 105, the control section 50 goes to the processing in the step S6.

The control section 50 goes to the processing in the step S6 and then sets the zapping time to a time period corresponding to the 10 s setting button 104 or 20s setting button 105 selected in the step S5. Thereafter, the control section 50 returns to the processing in the step S1 and waits until a command is newly inputted through the operating section 51.

Next, the control section 50 goes to the processing in the step S7 if it is determined in the determination processing in the step S3 that the command inputted through the operating section 51 is an operation command concerning the program selection buttons 101. In addition, if the control section 50 determines, in the determination processing in the step S4, that the command inputted through the operating section 51 is an operation command concerning the zapping button 103, the control section 50 switches ON the zapping mode as processing in the step S42 and thereafter goes to the processing in the step S7.

The control section 50 prepares a message for requesting resource reservation. This message is based on a high-speed resource reservation protocol (ASP) described above, and is therefore called an ASP message. For example, when any one of the program selection buttons 101-1 to 101-9 is operated in the step S1, the control section 50 reads resource reservation parameters of a program corresponding to the operated program selection button 101 from the data base 54, and interprets the parameters. The section 50 further determines an identification used for the connection, e.g., VCI (Virtual Channel Identifier)/VPI (Virtual Path Identifier), and prepares an ASP message for requesting resource reservation together with the resource reservation parameter thereof. In addition, if the zapping button 103 is operated in the step S1 and if the zapping mode is switched on in the step S42, the control section 50 reads resource reservation parameters of predetermined programs from the data base 54, and interprets the parameters. The section 50 then determines VCI/VPI and prepares an ASP message (resource reservation request message) for requesting resource reservation together with the resource reservation parameter thereof.

If an ASP message for requesting resource reservation is generated in the step S7, the control section 50 controls the communication section 53 in the step S8, so as to transmit the ASP message to the AMInet router 21.

The ASP message for requesting resource reservation transmitted from the communication section 53 is transferred to the video server 32 which is capable of providing a specified service among the video servers 32-1 to 32-N.

It can be considered that there are ways of processing of resource reservation for a network, i.e., resource reservation in the forward direction in which resource reservation is made in the same direction as the transmission direction of the ASP message, and resource reservation in the backward direction in which resource reservation is made in the direction opposite to the transmission direction of the ASP message. Details of the flow of the network resource reservation will be described later. For example, in the process of transmitting an ASP message for requesting resource reservation to a video server 32 from a client terminal 11, there is a case that resource reservation is made in the direction opposite to the transmission direction of the ASP message so that resource reservation is made firstly in the direction from the AMInet router 21 to the client terminal 11, next in the direction from the AMInet router 23 to the AMInet router 21, and then in the direction from the video server 32 to the AMInet router 23. There is another case that, for example, the video server 32 receives a message for requesting resource reservation transmitted from a client terminal, and resource reservation is made in the same direction (forward direction) as the transimssion direction of the ASP message, in the process of returning an ASP message as a reply to the client terminal 11 from the video server 32, so that resource reservation is made firstly in the direction from the video server 32 to the AMInet router 23, next in the direction from the AMInet router 23 to the AMInet router 21, and then in the direction from the AMInet 21 to the client terminal 11.

For example, in case where a client terminal 11 knows the amount of resources of a network which are necessary for receiving service data (video data and audio data), a reservation method is adopted in which resource reservation is made in the direction opposite to the transmission direction of the ASP message. For example, in case of Internet VoD which practices uni-cast providing, the client terminal 11 is previously notified of the amount of resources necessary for service data (video data and audio data), and the client terminal 11 reserves the amount of resources necessary for receiving service data (video data and audio data). Therefore, the resource reservation method in the opposite direction is adopted.

If the client terminal 11 does not know the amount of resources of the network that are necessary for receiving service data (video data and audio data), a reservation method is adopted in which resource reservation is made in the same direction (forward direction) as the transmission direction of the ASP message. For example, in case of Internet TV which practices multicast providing, the client terminal 11 is operated and a request of providing service data (video data and audio data) is issued to the server 32. Then, the server 32 reserves the amount of resources necessary for providing the service data (video data and audio data). Therefore, a resource reservation method in the same direction (forward direction) is adopted.

After an ASP message for requesting resource reservation is transmitted in the step S8, the control section 50 determines whether or not resource reservation is successful in the step S9. That is, upon receipt of a message expressing that resource reservation has been successful or failed as a result of resource reservation in the backward or forward direction, the control section 50 determines whether resource reservation has been successful or failed. If it is determined in the step S9 that resource reservation has been failed, the section 50 controls the display section 52 so as to display the cause of the failure of resource reservation, as processing in the step S10, and then returns to the processing in the step S1 thereby to advice a user to make again the operation for selecting a program.

Figure 7:
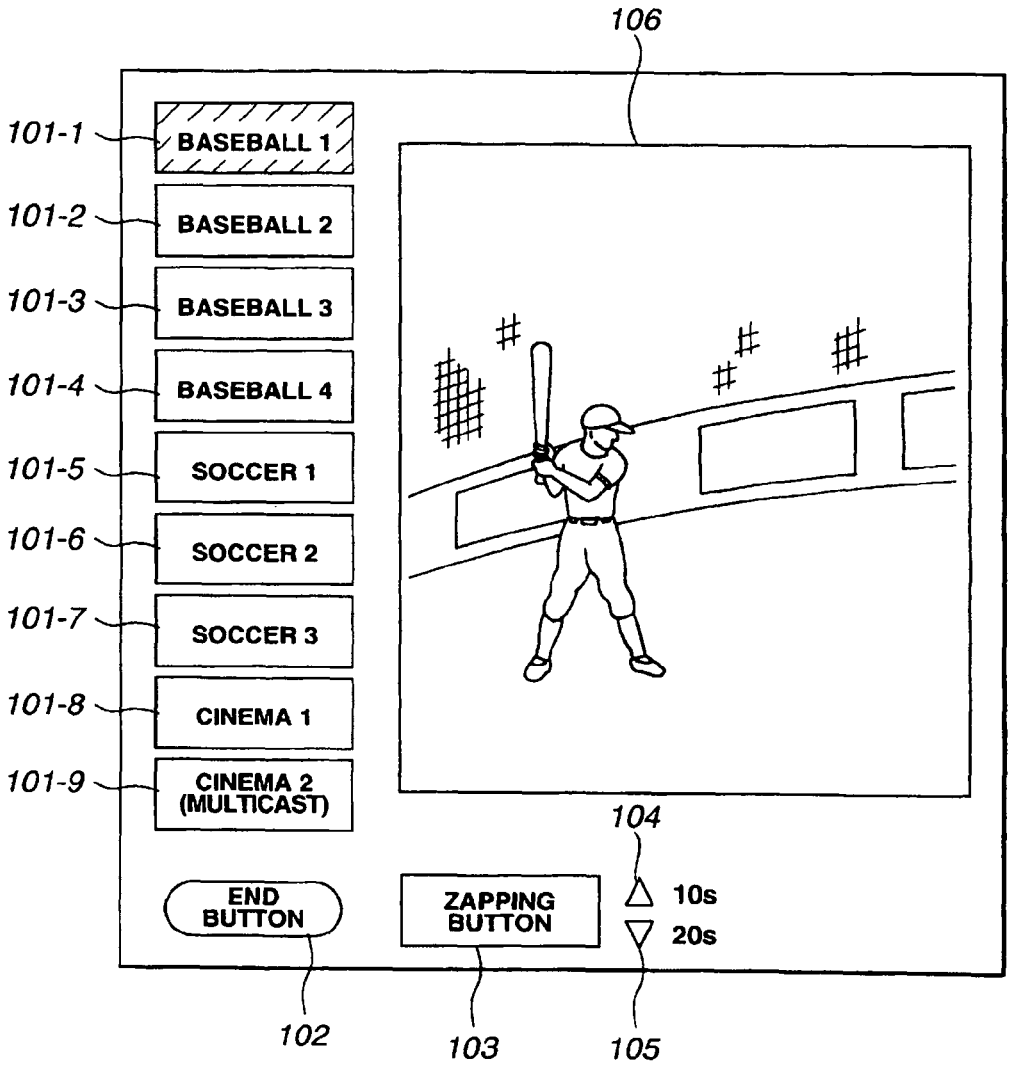
FIG. 7 is a view showing another display example of the screen of the client I/F.

If it is determined in the step S9 that resource reservation has been successful, the control section 50 controls the communication section 53, as processing in the step S11, so as to receive service data (video data and audio data of a program) transmitted from the video server 32. Next, the control section 50 goes to the processing in the step S12 and controls the display section 52 so as to display the video of the received service data on the video display section 106 of the client I/F. In this manner, a video of a program corresponding to the program selection button 101-1, e.g., the video of "Baseball 1" is displayed on the video display section 106, as shown in FIG. 7.

Next, in the step S43, the control section 50 determines whether or not the zapping mode has been switched on. If it is determined in the step S43 that the zapping mode has been switched on, the control section 50 determines whether or not any command has been inputted from the operating section 51, in the step S44. If it is determined no command has been inputted from the operating section 51, the control section 50 determines whether or not a setting time of the zapping (zapping time) has elapsed, in the step S15. That is, if the 10 s setting button 104 is operated in the step S6 and a zapping time of 10 seconds is set, the control section 50 determines whether or not 10 seconds have passed. Otherwise, if the 20 s setting button 105 is operated in the step S6 and a zapping time of 20 seconds is set, the control section 50 determines whether of not 20 seconds have passed. If the time of the initial setting is set as the zapping time, the control section 50 determines whether or not the time of the initial setting has passed.

Meanwhile, if it is determined in the step S15 that the set zapping time has not elapsed, the control section 50 returns to the processing in the step S11 and executes the processing from the step S11 to the step S15 until the set zapping time elapses.

If it is determined in the step S15 that the set zapping time has elapsed, the control section 50 goes to the processing in the step S46. When the control section 50 thus enters into to the processing in the step S46, the control section 50 generates an ASP message (resource reservation release request message) for requesting release of the reservation, and controls the communication section 53 so as to transmit the ASP message to the AMInet router 21. The ASP message for requesting release of the resource reservation contains information for specifying a service to be terminated, e.g., information specifying a server, information specifying a client terminal, and the like.

The flow of the release processing of resource reservation on a network adopts release of resource reservation only in the backward direction in which release of the resource reservation is carried out in the direction opposite to the transmission direction of the ASP message, unlike the request for resource reservation. For example, in the process in which an ASP message for requesting release of resource reservation is transmitted from the client terminal 11 to the video server 32, there may be a case that release of resource reservation is made in the direction opposite to the transmission direction of the ASP message so that the release is made firstly in the direction from the AMInet router 21 to the client terminal 11, next in the direction from the AMInet router 23 to the AMInet router 21, and then in the direction from the video server 32 to the AMInet router 23.

After the ASP message for requesting releaser of resource reservation is transmitted in the step S46, the control section 50 makes control so as to receive a message expressing the result of the release of resource reservation from the AMInet 21, and determines whether or not the release of resource reservation has been successful. That is, upon receipt of a message expressing success or failure of release of resource reservation as a result of release of resource reservation in the backward direction, the control section 50 determines whether or not the releaser of resource reservation has been successful, depending on the message. For example, if release of resource reservation has been failed due to a disconnection on the network or the like and a message expressing this failure is received, the control section 50 determines that the release of resource reservation has been failed, in the step S47. Next, as processing in the step S18, the control section 50 controls the display section 52 so as to display the reason for the failure of the release of resource reservation or the like, and then returns to the processing in the step S1 to advise the user to make operation again for program selection or zapping.

Meanwhile, if it is determined in the step S47 that the releaser of resource reservation has been successful, the control section 50 executes setting of a channel (program) to be displayed next by zapping, as processing in the step S48. That is, at this time, the control section 50 sets a program next to the program presently displayed on the video display section 106 of the client I/F, e.g., a program corresponding to the program selection button 101 in the lower stage. The control section 50 then returns to the processing in the step S7, and reads the resource reservation parameter corresponding to the program from the data base 54, thereby to prepare an ASP message for requesting resource reservation. Subsequently, the processing from the step S8 to the step S48 is executed with respect to the channel thus reset, so that the programs corresponding to the program selection buttons 101 are displayed sequentially on the video display section 106 and zapping is thus carried out.

In addition, if it is determined in the step S43 that the zapping mode has not been switched on, the control section 50 goes to the processing in the step S13. The control section 50 thus goes to the processing in the step S13, and then determines whether or not any command has been inputted from the operating section 51. If it is determined that no command has been inputted from the operating section 51, the control section 50 returns to the step S11 and continues processing for receiving service data, Meanwhile, if it is determined in the step S13 that there has been any input from the operating section 51, the control section 50 goes to the processing in the step S16.

If it is determined in the step S13 that the command inputted through the operating section 51 is a command for changing the program displayed to the video display section 106 of the client I/F, i.e., if the user operates the operating section 51 and selects a program selection button 101 corresponding to another program, the control section 50 releases the resource currently reserved, as processing from the step S16.

That is, the control section 50 goes to the processing in the step S16 and then generates an ASP message for requesting release of resource reservation. Then, the control section 50 controls the communication section 53 so as to transmit the ASP message to the AMInet router 21. The ASP message for requesting release of the resource reservation at this time contains information specifying a server, information specifying a client terminal, and information specifying a service to be ended. Note that the flow of the processing of releasing resource reservation on the network may be oriented in the backward direction and the forward direction.

After an ASP message (resource reservation release request message) for requesting release of resource reservation is transmitted in the step S16, the control section determines whether or not the release of resource reservation is successful, in the step S17. If it is determined in the step S17 that the release of resource reservation has been failed, the control section 50 controls the display section 52 as processing in the step S18, so as to display the reason for the failure of the release of the resource reservation or the like, and then returns to the processing in the step S1 thereby to advise the user to make operation again for selecting a program.

Meanwhile, if it is determined in the step S17 that the releaser of resource reservation has been successful, the control section 50 returns to the step S2. If it is determined in the step S2 that an end of the client I/F has not been commanded, the control section 50 goes to the step S7 through the step S3. In this step S7, the resource reservation parameter of the program newly selected (in the step S13) is read out. Subsequently, the control section 50 executes the processing from the step S8, so that a video of another program is displayed on the video display section 106. In the present embodiment, the control section 50 can thus switches the program to be displayed on the video display section 106 of the client I/F.

In addition, if it is determined in the step S44 that any command has been inputted from the operating section 51, the control section determines whether or not the 10 s setting button 104 or the 20 s setting button 105 has been pressed, in the step S50. If it is determined in the step S50 that the 10 s setting button 104 or the 20s setting button 105 has been pressed, a zapping time is set in correspondence with the pressed setting button in the step S51, and the control section 50 thereafter returns to the step S11. Otherwise, if it is determined in the step S50 that the 10 s setting button 104 or the 20 s setting button 105 has not been pressed, the control section 50 switches off the zapping mode, in the step S49, and thereafter goes to the processing in the step S52. The control section 50 thus goes to the step S52 and then determines whether or not the zapping button 103 has been pressed. If the zapping button 103 has been pressed, the control section 50 goes to the step S11. Otherwise, if not pressed, the control section 50 goes to the processing in the step S16. In case where the control section 50 thus goes to the processing in the step S16, the same processing as described above is carried out.

From the above, the user can easily select, watch, and listen to a program without being conscious about reservation of a resource or release thereof, in the same manner as the user selects a channel of a television receiver set.

Figure 8:
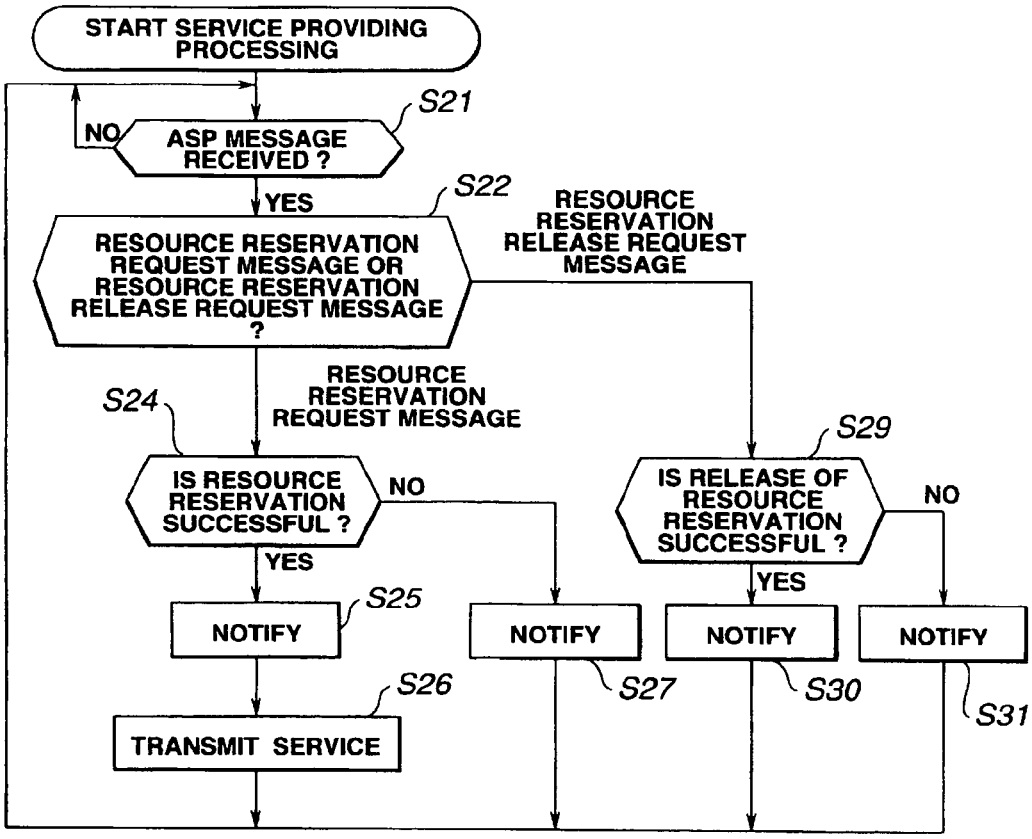
FIG. 8 is a flowchart which explains an operation example of a video server.

Next, FIG. 8 explains the processing procedure in the CPU 61 of a video server (e.g., a video server 32-1) which provides service data.

In a state in which the server program stored in the hard disk 64 has been started, the CPU 61 waits until the communication section 65 receives an ASP message from the client terminal 11 or 12, as processing in the step S21. Upon receipt of the ASP message, the CPU 61 goes to the step S22.

The CPU 61 thus goes to the processing in the step S22 and then determines whether the received ASP message is a message for requesting resource reservation or a message for requesting release of resource reservation. If it is determined that the message is for requesting resource reservation, the CPU 61 goes to the step S24.

There are two ways for resource reservation in the network, e.g., resource reservation in the forward direction in which resource reservation is made in the same direction as the transmission direction of the ASP message and resource reservation in the backward direction in which resource reservation is made in the direction opposite to the transmission direction of the ASP message. When the processing goes to the step S24, the CPU 61 of the video server 32 receives a message expressing that resource reservation has been successful or failed, from each AMInet router.

If it is determined in the step S24 that resource reservation has been successful, the CPU 61 controls the communication section 65 so as to transmit a message expressing that resource reservation has been successful, as processing in the step S25, and so as to transmit service data recorded in the hard disk 64 or data outputted from a device connected to the I/O section 66, to the client terminal 11 or 12 through the AMInet 20, in the step S26. Thereafter, the CPU 61 returns to the step S21.

Meanwhile, if it is determined in the step S24 that resource reservation has been failed, the CPU 61 controls the communication section 65 so as to transmit a message expressing that resource reservation has been failed, to the client terminal 11 or 12 through the AMInet 20, as processing in the step S27. Thereafter, the CPU 61 returns to the step S21.

In addition, if it is determined in the determination processing in the step S22 that the received ASP message is a message for requesting release of resource reservation, the CPU 61 goes to the step S29.

Release of resource reservation in the network takes place only as release of resource reservation in the direction opposite to the direction of the ASP message, as described above. The CPU 61 of the video server 32 goes to the processing in the step S29 and then receives a message expressing that release of resource reservation has been successful or failed from each AMInet router. Depending on the message, the CPU 61 determines whether or not release of resource reservation has been successful.

If it is determined in the step S29 that release of resource reservation has been successful, the CPU 61 controls the communication section 65 so as to transmit a message expressing that release of resource reservation has been successful, to the client terminal 11 or 12 through the AMInet 20, as processing in the step S30. Thereafter, the CPU 61 returns to the step S21.

Otherwise, if it is determined in the step S29 that release of resource reservation has been failed, the CPU 61 controls the communication section 65 so as to transmit a message expressing that release of resource reservation has been failed, to the client terminal 11 or 12 through the AMInet 20, as processing in the step S31. Thereafter, the CPU 61 returns to the step S21.

Next explanation will be made of realization of real-time communication based on integration of ATM and IP in the AMInet (ATM Control through IP for Real-Time Communication in AMInet). This explanation deals with the backbone as a prerequisite of the AMInet and the resource reservation protocol ASP (AMInet Set-up Protocol) used in a wide area network which connects with homes. This technique is disclosed in the Japanese Patent Application No. 9-279826 (filed on Sep. 26, 1997, by the same applicants as in the present application, not opened on the priority data), and U.S. patent application Ser. No. 08/160,472 (filed on Sep. 24, 1998, granted to the same applicants as in the present application).

The ASP considers flexibility and applicability of IP and ATM as a channel-oriented data link, and integrates them thereby to realize high-speed flexible resource reservation. The ASP does not utilizes normal signaling of ATM but constructs ATM VC (Virtual Channel) by using a message transmitted by IP.

The ASP (AMInet Set-up Protocol) is a resource reservation protocol which operates in a wide area network and particularly in the environment constituted by routers based on the AMInet architecture. The AMInet is constituted by routers each having an ATM switching function, which are backbone routers and edge routers provided between the backbone routers. The resource to be reserved is a cue or the like which is used during ATM VC processing or packet processing. Particularly in the case of integration with ATM, the ASP does not utilize a normal ATM signaling but a VC is constructed in a router having an ATM switch or ATM function. Also, in the ASP, since IP is used to transmit a set-up message for resource reservation, high-speed resource reservation can be realized. Accordingly, the ATM switch does not use a VC of AIM called SVC (Switched Virtual Channel) at all, but a VC is dynamically constructed by a message using IP. Note that this kind of VC is called a PVC (Permanent VC)-on-demand. This PVC-on-demand can dynamically establish or disconnect a VC in a form different from a normal SVC by using ASP.

Even in case of using the ASP, data is transmitted by normal IP. Therefore, an IP packet is mapped on a specific reserved resource. Accordingly, the ASP can easily respond widely to applications which have been conventionally used and also new applications which will be released in the future. This mapping is achieved by comparing sources with destination IP addresses, sources with destination port numbers and protocol identification fields. Normal IP traffic, i.e., best effort traffic (BE) is transferred through a default BE VC. Resources reserved by using the ASP are not influenced by the BE traffic. In addition, a flow gathered into one VC in view of saving resources can coexist without being influenced by the BE traffic.

Next, a flexible set-up mechanism will be explained. In the ASP, resources can be reserved in various forms to use resources efficiently or to make resource reservation which matches with a request from an application. That is, in the Internet or ATM environment, there are various kinds of applications including application of broadcasting type and applications of conversation type in which data is transmitted in both directions, such as television meeting, remote diagnosis, video-on-demand (VoD), a multicast application using Mbone, and the like. According to the ASP, QoS parameters can be efficiently mapped scalably onto resource reservation parameters in the lowermost layer, in any cases.

For example, in the case of VoD, since data always flows from a server toward a client terminal, a VC needs not be constructed in two interactive directions. That is, in case of using ASP, exchanges of messages inherent to ASP, exchanges of controls other than data transmissions necessary for applications (e.g., a request or so for changing a video to be watched from a client terminal side), and exchanges necessary for upper layers (e.g., a transport layer and the like) can be realized only by using a default BE VC or another specialized VC. ASP messages are transmitted through a default BE VC or a specified special VC.

Meanwhile, a TV meeting application of conversation type requires a bi-directional VC, and the ASP responds to a bi-directional VC like this conversation type application. Further, a conversation type application supports an asymmetrical model in which different pieces of QoS are respectively set for the upstream and downstream traffics.

Also, in the ASP, a resource reservation request can be issued from the receiver side and also from the transmitter side, like in the case of RSVP or ST-2+ (Stream Transport Protocol-2+). That is, depending on the application or the environment, the QoS information required when reserving a resource is possessed by the transmitter side in some cases and by the receiver side in the other cases. In any cases, the ASP can set so as to perform all reservations through one bus. Further, the ASP can have a response message which notifies that reservation has been completed upon necessity.

Figure 9:
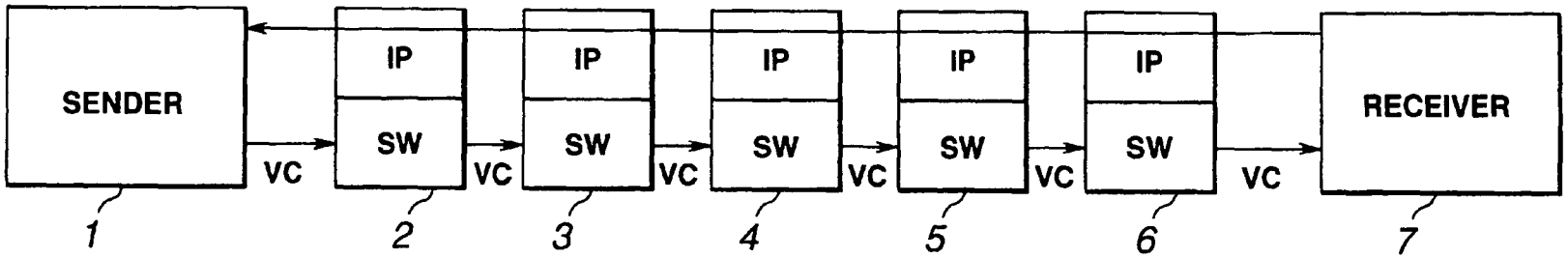
FIG. 9 is a view for explaining a state in which the receiver side is issuing a resource request message.

FIG. 9 shows an example in which a message for requesting resource reservation is issued as an ASP message by the receiver side.

This shows a case where a broadcasting type application for a video utilizes the ASP. That is, data is transmitted only in the direction from a server (hereinafter called a sender) 1 as a transmitter side to a client terminal (hereinafter called a receiver) 7. Among the routers 2 to 6 in the figure, the routers 2 and 6 are edge routers, and the routers 3, 4, and 5 are backbone routers.

In the receiver 7, at first, QoS parameters are interpreted thereby to determine VPI/VCI used in this connection, and an ATM NIC (Network Interface Card) is set if necessary. Also, the receiver 7 prepares an ASP message (resource reservation request message) containing this information and transmits this ASP message toward the edge router 6 adjacent to the backbone (backbone router 5). This ASP message is transmitted by IP, and processed every time IP is hopped. In the case of the example shown in FIG. 9, when a message reaches the edge router 6, the edge router 6 sets VPI/VCI parameters toward the receiver 7. The VPI/VCI is individually managed in each node. Thus, the ASP message is transferred in the upstream direction toward the sender 1. In each of the routers 2 to 6, a VC is set in the direction opposite to the direction in which the ASP message is transmitted (resource reservation in the backward direction). Although not shown in the figure, when an ASP message is transmitted to the sender 1 and reservation is substantially completed, a reply message is transmitted from the sender 1 to the receiver 7. At this time point, a VC is constructed from the sender 1 toward the receiver 7 at least in the backbone router. That is, in the structure shown in FIG. 3, IP is cut through during data transfer by using the VC, so that communication can be made by only the ATM.

FIG. 9 shows only one form of flexible set-up in the ASP. For example, in case where only the sender 1 has QoS information and a resource reservation request is issued from the receiver 7 by a multicast application, a message can be prepared such that setting of a VC is carried out at the second path the reply message in the above example is returned. Further, it is possible to construct a bi-directional VC with only the first path.

Next, in the ASP, since an ATM VC is constructed by its original set-up mechanism, it is unnecessary to prepare previously another VC and QoS of a resource already reserved can be dynamically changed. In addition, the application can upgrades the service level. For example, in case where BE is simply shifted to integrated services (IS), the data flow can be remapped onto a new VC as shown in FIG. 9 from a default BE VC.

Next explanation will be made of integration with QoS routing. In the ASP, supports for selecting a route have been considered when setting up a VC. Specifically, when reserving a resource, a routing table in the conventional IP level is not used but route information is supplied from a module which manages an original routing table for a flow requiring IS. In this manner, in the ASP, a different route can be used for every flow in match with the QoS request and the situation of usable resources.

In addition, conventional resource reservation protocols and routing mechanisms have been considered respectively on the basis of prerequisites independent from each other. However, the ASP realizes integration with QoS routing. This is carried out by feeding back resource reservation information held by the ASP to the module of the QoS routing. Therefore, in the ASP, selection of a substitutive route is easy when reservation is failed, and the entire network can be efficiently utilized without concentrating resource reservation onto one route.

Figure 10:
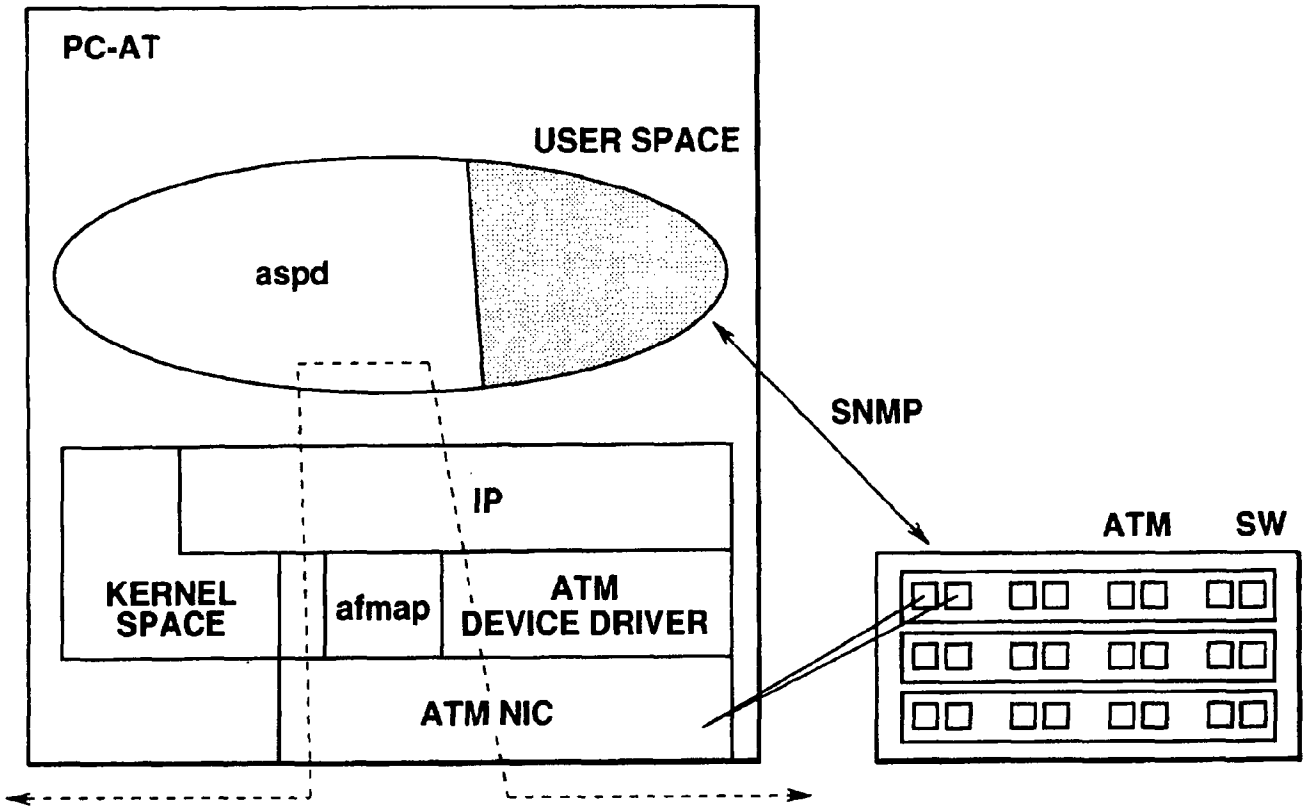
FIG. 10 is a view showing an example of the structure of ASP.

Next, the ASP is equipped, for example, as demon process (aspd) of UNIX, in the user space. A prototype is now operating at FreeBSD 2.2.1, and is integrated with libraries (swctl lib) for controlling the ATM switch and a module (afmap) for setting ATM NIC (see FIG. 10). At present, three types of routers are supported and the home router has interfaces for 100Base-T Ethernet and ATM. The edge router is realized as a router having a plurality of ATM interfaces. The backbone router is constructed by a PC including an ATM switch and an IP engine for controlling the ATM switch. The presently existing prototype uses ATM interface cards for PCI bus and a Fore ASX-200WG ATM switch, manufactured by Adaptec and Efficient Networks. ASP messages are equipped with use of raw IP.

The backbone router uses switch control libraries described above in order to set PVC-on-demand by the equipped switch. The IP flow which requires IS is mapped to a VC of CBR (Constant Bit Rate). In addition, at present, the ASP respond to multicast by creating a one-to-many multicast VC. Further, the ASP supports join and resource reservation by a leaf.

In consideration of scalability of ATM resources starting from identifications such as VCI and the like, the IP flow is mapped onto a VC in units of applications with only a low efficiency. However, in this case, the flow can be dynamically gathered into a VC by using the ASP.

The above description has been made of resource reservation protocol ASP in the AMInet. The ASP has introduced its original set-up mechanism and integrates the flexibility of IP and the QoS guarantee by a VC. Accordingly, the AMInet realizes dynamic QoS changes, integration with QoS routing, and flexible set-up, so that high-speed set-up can be realized by equipping a prototype.

Next, explanation will be made of the details of the ASP (AMInet Set-up Protocol) as a protocol for carrying out resource reservation in the AMInet. In this case, the term of "set-up" means that status/information is set for resource reservation in a receiver and a sender or a router on the way of the route when resource reservation is carried out.

By the ASP, a VC having a channel exchange function in a lower layer or assignments of cues (e.g., class of CBQ (Class Based Queueing) and the like) which the packet scheduler can provide are expressed in abstract as resources, and correspondences are assigned such that data flowing through an IP network is transferred without influencing other data. As a specific example, the ASP carries out abstract expression as resources which are controlled by the VC of ATM and UPC (Usage Parameter Control), and the resources are reserved. The VC is let correspond to the flow of IP. Here, the term of "flow" expresses the information as follows. The information are a protocol as a protocol identifier, a destination IP address as an IP address of a receiver, a source IP address as an IP address of a sender, a destination port address of a receiver, and a source port address of a sender.

The set-up of the ASP, i.e., exchange of a protocol message of the ASP is equipped on the IP. Therefore, in case of preparing a VC of ATM or the like on demand, it is unnecessary to use the signaling mechanism actually prepared by the ATM, and this limitation is avoided so that flexible and efficient resource reservation can be achieved.

In addition, the ASP has functions which are mainly the same as those of RSVP and ST-2 and flexibly respond to the VC of the ATM, thereby effecting the following functions. That is, reservation of resources can be achieved both under the control by the receiver side and under the control by the sender side, both in a hard state and a soft state. Flexible set-up can be achieved in consideration of the VC of the ATM, and assignments of bands (resources) specialized for protocol control (reservation control) can be achieved.

Figure 11:
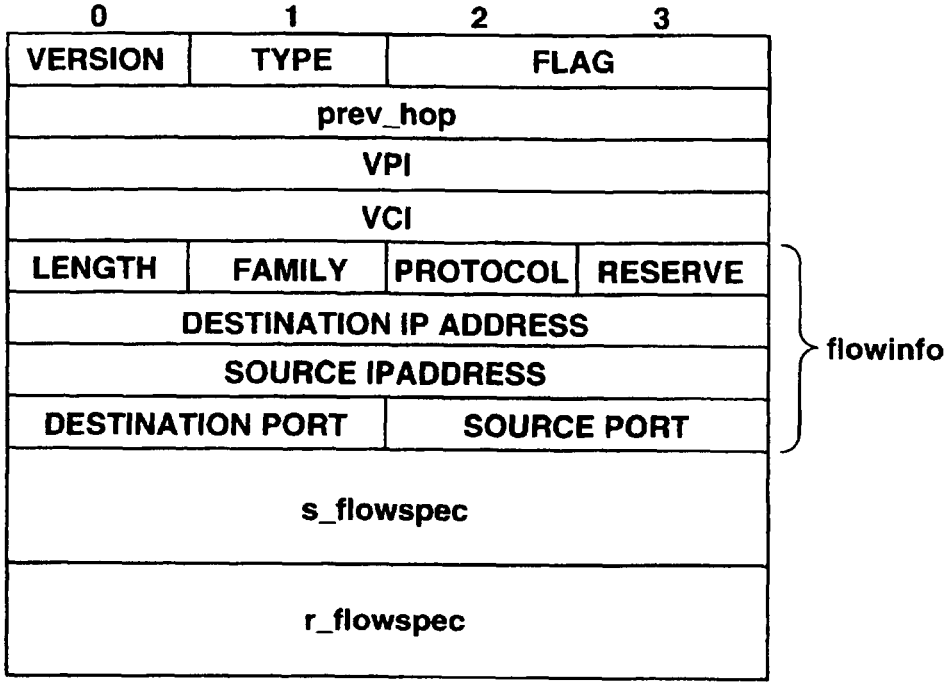
FIG. 11 is a view showing an example of the format of the ASP header.

FIG. 11 shows an example of the format of a header of the ASP. Set in the field of flags in FIG. 11 is information indicating that the direction in which a resource is reserved is one single direction or two interactive directions. Set in the prev_hop field is information for making massages pass through one same route in case where exchange of messages reciprocally carried out between a receiver and a sender. VPI (Virtual Path Identifier) is set in the next VPI field, and VCI (Virtual Channel Identifier) is set in the VCI field.

In the next field, information of the above flow (flowinfo) is set. This flow information includes, for example, length, address family, reserved, protocol as a protocol identifier, destination IP address as an IP address of a receiver, a source IP address as an IP address of a sender, a destination port address of a receiver, and a source port address of a sender.

Thereafter, the flow specification of the sender (s_flowspec) and the flow specification of the receiver (r_flowspec) are set. The flow specification of the sender (s_flowspec) indicates QoS necessary for data which the sender sends, while the flow specification of the receiver (r_flowspec) indicates QoS necessary for data which the receiver sends. In the presently existing prototype, only the peak cell rate for setting a CBR (Constant Bit Rate) service of the ATM is included in each flowspec field.

Figure 12:
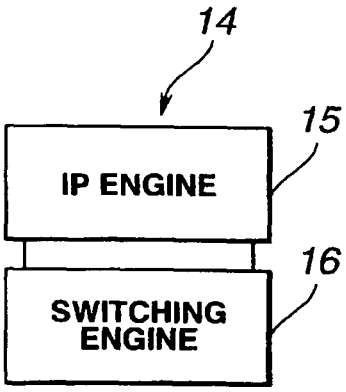
FIG. 12 is a view showing an example of the structure of a backbone router.
Figure 13:
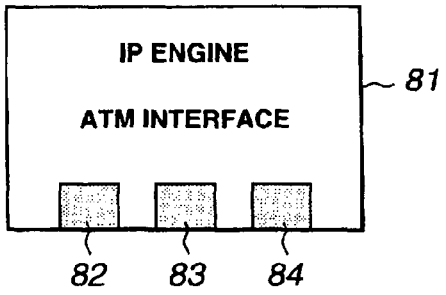
FIG. 13 is a view showing an example of the structure of an edge router.

Routers in the form equipped with the ASP are mainly classified into a backbone router as shown in FIG. 12, an edge router as shown in FIG. 13, and a home router. In addition, it is necessary for the end host to exchange ASP messages.

The backbone router 14 is an intermediate node for constructing a large scale network and the substance thereof is constructed by a software engine (IP engine) 15, and a switch section (e.g., ATM SW) (switching engine) 16 which provides a VC mechanism. That is, in this case, the backbone routers are connected to each other thereby constructing an IP network. However, cut-through is enabled by setting a VC.

An edge router 81 is provided at an entrance/exit of a net formed by a plurality of backbone routers. There is a possibility that another network or another router is connected in the side opposite to the backbone. The edge router 81 has a protocol stack of a normal IP, and one or more ATM interfaces 82 to 84.

Figure 14:
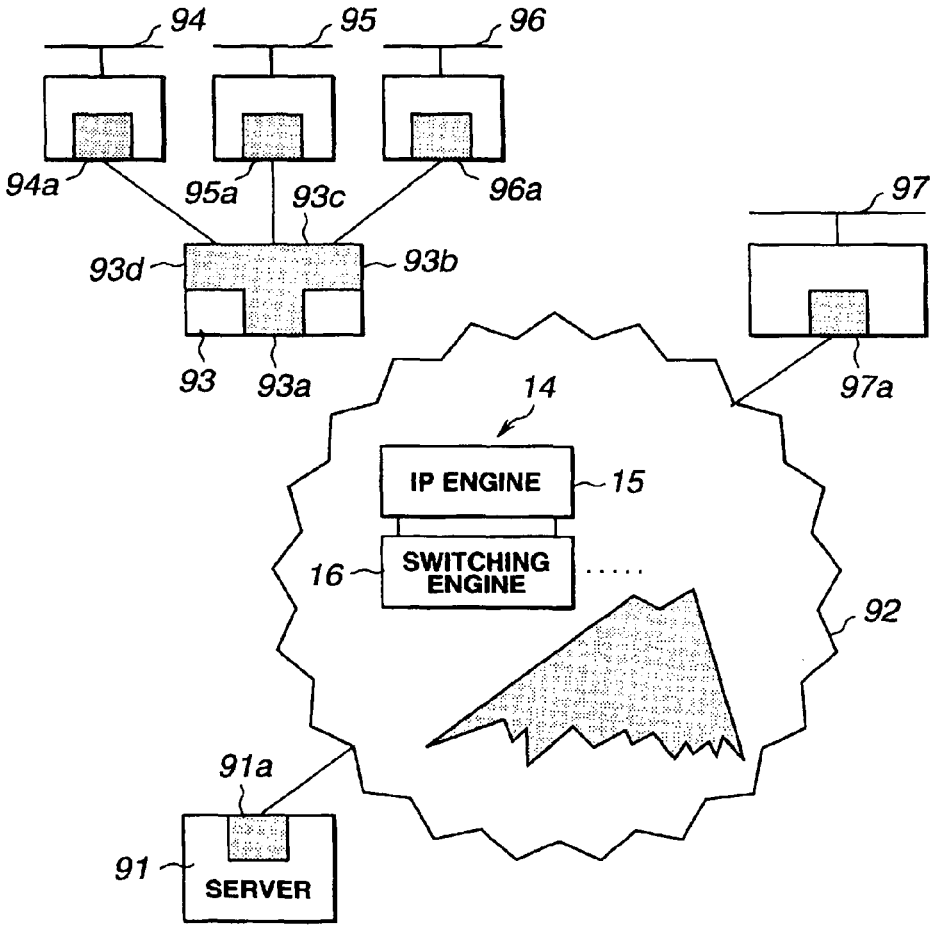
FIG. 14 is a view showing an example of the structure of a network.

FIG. 14 shows an example of connection of the entire network. As shown in this figure, servers (senders) 91 and 97 may be connected directly to the backbone 92 consisting of a plurality of backbone routers 14. However, normal end nodes 94 to 96 are connected to the backbone 92 through the edge router 93. Also, another router can be set at the top of the edge router 93. The end node (receiver) 94 is connected to the edge router 93 through the ATM interface 94a. The end node (receiver) 95 is connected to the edge router 93 through the ATM interface 95a. The end node (receiver) 96 is connected to the edge router 96 through the ATM interface 96a.

In this case, resources reserved by the routers and the method of reservation thereof are important for the ASP. It is necessary for the backbone router to set a VC in the switch.

Also, the backbone router 92 needs to map a specified flow to a newly prepared VC (resource) at the entrance through which data flows into the backbone. Mapping to the VC is carried out by an edge router. In case where a server is directly connected to the backbone, the ATM interface to the backbone of the node needs to carry out mapping onto the VC.

Figure 15:
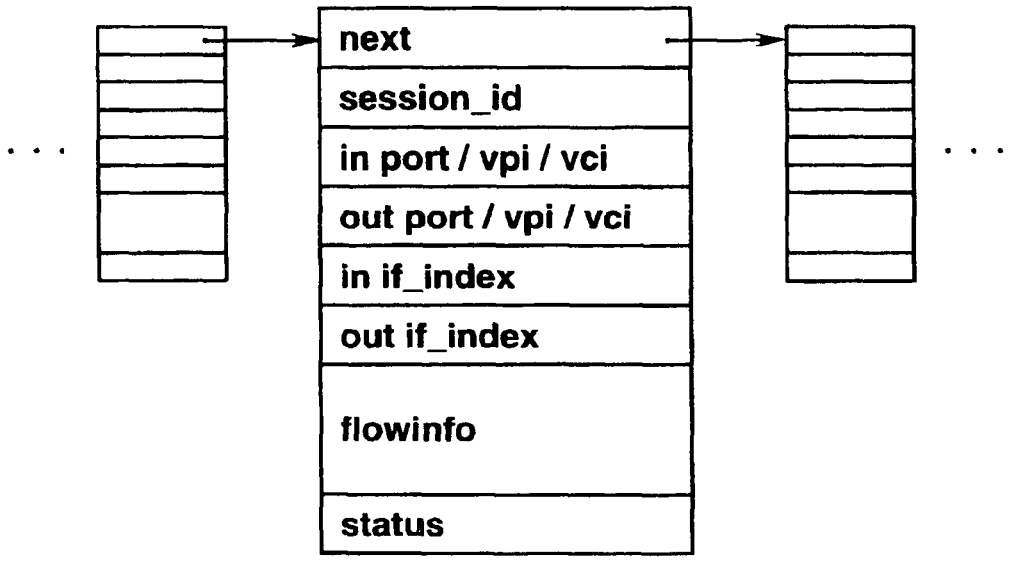
FIG. 15 shows an ASP internal table.

A status table for managing a reservation situation of resources as shown in FIG. 15 is maintained in the ASP module of each node.

This table manages information of the VC for input and information of the VC for output and makes correspondences between the VC and the flow information (flowinfo). In addition, since information concerning network interfaces for input and output is required in case of an edge router, a field for the information is provided. In this case, the port section of corresponding VC information is not used.

To make normal communication such as communication by IP, the VC of the ATM needs to be prepared in two interactive directions. However, the VC can be constructed flexibly by using the ASP.

Some applications require communication in one single direction and other applications require communication interactively in two directions. For example, in case of an application in the form of VoD (Video on Demand), communication to a server may take place when a receiver issues a request for an image, although a video data flows only in one single direction from a server (sender) to a client terminal (receiver). That is, in this case, for example, resource reservation messages are exchanged through, a specialized VC by making a request to the ASP. The other necessary exchanges flow through a default data VC (e.g., a normal route of IP). Accordingly, in this case, an application which requests a resource to the ASP needs only to form a VC only in one single direction by specifying the single direction communication, and therefore, the identification and band width can be saved. Also, in case of multicast in the broadcasting side, resource reservation can be sufficiently realized by this reservation method.

However, in case of a conversation type application such as video conference or the like, data flows bi-directionally. The necessity that data must flow bi-directionally is common to normal communication. However, in case of using the ASP, the application can set different QoS for data of each direction. Setting of QoS with respect to the flows of data in two interactive directions is performed on the basis of the values (s_flowspec and r_flowspec) in two flow spec fields (flowspecs). In case where a null (NULL) value is contained in any flow spec field, reservation of the VC in its direction is not carried out.

Figure 16:
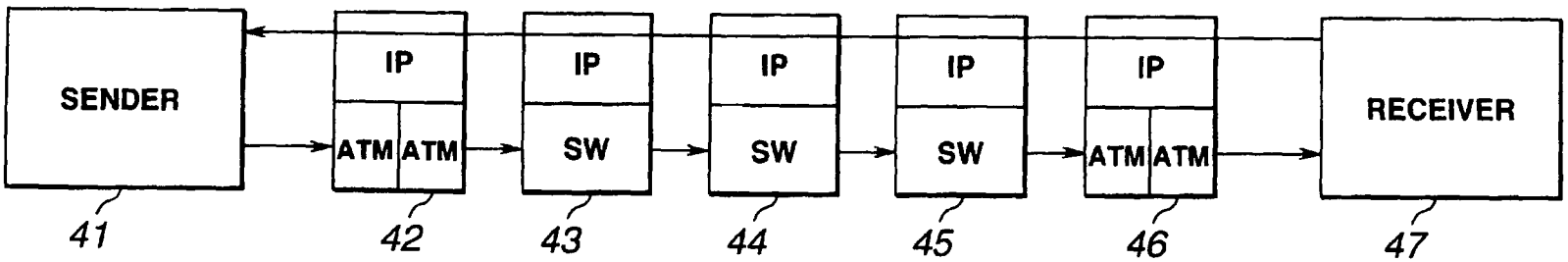
FIG. 16 is a view showing the flow of an ASP message and explaining the procedure until a VC is constructed in case where the receiver knows QoS.

FIG. 16 shows the procedure in which a VC in one single direction is constructed in case where the receiver 47 knows QoS. Note that the routers 42 and 46 are edge routers, and the routers 43, 44, and 45 are backbone routers. That is, the receiver 47 sets, for example, a value of 0 which indicates that the direction in which a VC is constructed is one single direction, in the flag (flags) field of the ASP header, and sets information expressing the band width of the VC (e.g., 5M bps (Mega-bit/second)) in the flowspec (s_flowspec) of the sender of the ASP sender. The receiver 47 then transmits them to the sender 41. As a message of the ASP flows from the receiver 47 to the sender 41, each router constructs a VC in the direction opposite to the direction in which the ASP message flows.

At first, the edge router 46 constructs a VC in the direction opposite to the direction in which the ASP message flows. Likewise, the VC is constructed by the backbone routers 45, 44, and 43 and the edge router 42 each in the direction in which the ASP message flows.

At this time, in each switching engine SW which constructs the backbone routers 43 to 45, a predetermined input port and a predetermined output port are connected to each other and the VC is constructed.

Figure 17:
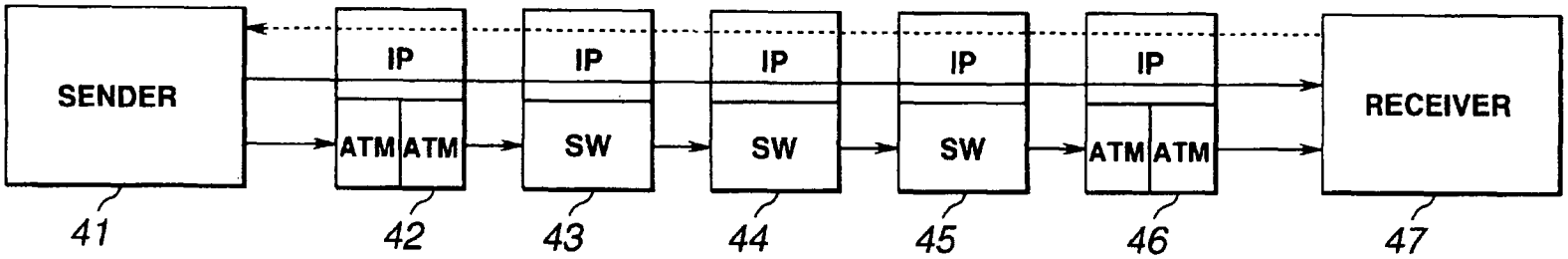
FIG. 17 is a view showing the flow of an ASP message and explaining the procedure of extending a VC in case where only the sender knows QoS.

FIG. 17 shows the procedure through which the VC is constructed in case where only the sender knows QoS.

At first, the receiver 47 transmits, to the sender 41, an ASP message in which a null (NULL) value is set in the flowspec (s_flowspec) field of the sender in the ASP header, and requests construction of a VC. Upon receipt of this ASP message, the sender 41 interprets this message and sends, by return, an ASP message in which a value corresponding to a predetermined band width is set in the flowspec (s_flowspec) field of the sender in the ASP header. Each router constructs a VC in the same direction as the direction in which this ASP message flows. That is, the VC is constructed in the same direction as the direction in which the ASP message flows each by the edge router 42, the backbone routers 43, 44, and 45, and the edge router 46.

Figure 18:
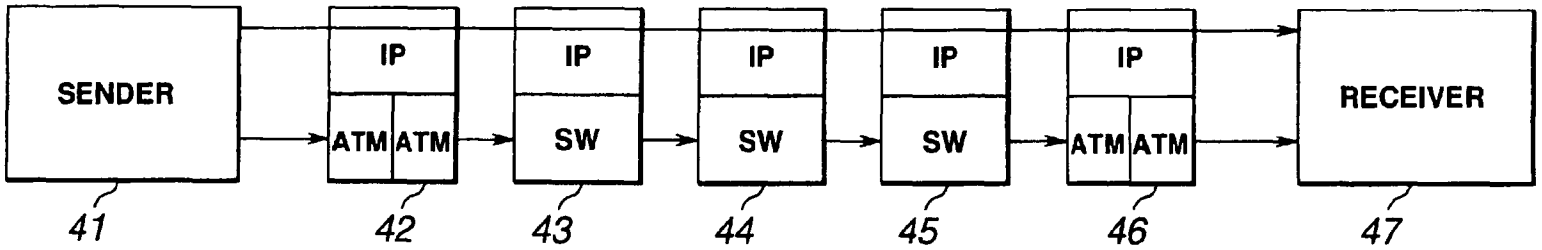
FIG. 18 is a view showing the flow of an ASP message and explaining the procedure of extending a VC in case where the sender starts reservation.

FIG. 18 shows a procedure in which a VC is extended in case where the sender 41 starts reservation. In this case, an ASP message flows in one single direction, and routers construct a VC. That is, the sender 41 transmits an ASP message in which a value corresponding to a predetermined band width is set in the flowspec (s_flowspec) field of the sender in the ASP header.

Based on this ASP message, the edge router 42 constructs a VC in the same direction as the direction in which the ASP message flows, at first. Next, the VC is constructed in the order of the backbone routers 43, 44, and 45 and the edge router 46.

In many cases, the sender cannot send data before the sender confines that reservation has been completed. Thereafter, an ASP message for confirmation is sent from the receiver 47 to the sender 41, although not shown in the figure.

Figure 19:
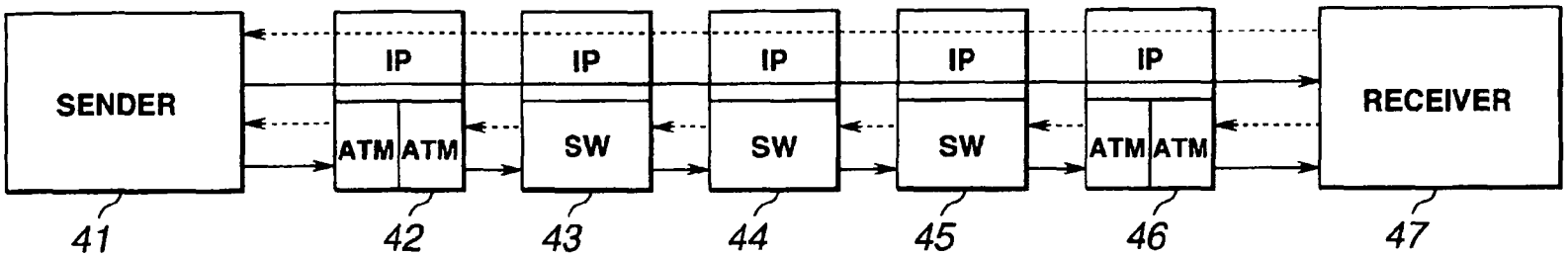
FIG. 19 is a view explaining the procedure of performing bi-directional communication in case where each of the sender and receiver knows QoS.

FIG. 19 shows a procedure in which bi-directional communication is carried out in case where each of the sender and the receiver knows the QoS which is required when transmitting data. In this case, when an ASP message (resource reservation request message) flows in each direction, a VC is extended in each direction.

That is, the sender 41 transmits, to the receiver 47, an ASP message in which a value corresponding to the band width of the VC in the downstream direction (e.g., the direction from the sender 41 to the receiver 47) is set in the flowspec (s_flowspec) field of the sender in the ASP header. In this manner, a VC in the downstream direction which is the same as the direction in which the ASP message flows is constructed by the edge router 42, the backbone routers 43, 44, and 45, and the edge router 46, in this order.

Meanwhile, the receiver 47 transmits, to the sender 41, an ASP message in which a value corresponding to the band width of the VC in the upstream direction (e.g., the direction from the receiver 47 to the sender 41) is set in the flowspec (r_flowspec) field of the receiver in the ASP header. In this manner, a VC in the upstream direction which is the same as the direction in which the ASP message flows is constructed by the edge router 46, the backbone routers 45, 44, and 43, and the edge router 42, in this order.

Figure 20:
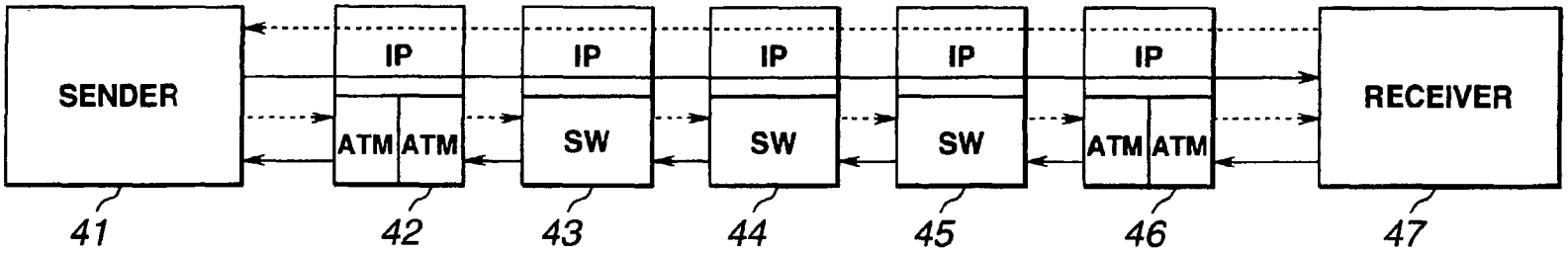
FIG. 20 is a view showing the flow of each ASP message and explaining the procedure of extending a VC in the direction opposite to the flow in case where each of the sender and receiver knows QoS.

Also, as shown in FIG. 20, in case where each of the sender and receiver knows QoS which is required when receiving data, an ASP message (resource reservation request message) flows in each direction, and then, a VC is extended in the direction opposite to the direction in which each message flows, on the contrary to the case shown in FIG. 19.

That is, the sender 41 transmits, to the receiver 47, an ASP message in which a value corresponding to the band width of the VC in the upstream direction (e.g., the direction from the receiver 47 to the sender 41) is set in the flowspec (r_flowspec) field of the receiver in the ASP header. In this manner, a VC in the upstream direction which is opposite to the direction in which the ASP message flows is constructed by the edge router 42, the backbone routers 43, 44, and 45, and the edge router 46, in this order.

Meanwhile, the receiver 47 transmits, to the sender 41, an ASP message in which a value corresponding to the band width of the VC in the downstream direction (e.g., the direction from the sender 41 to the receiver 47) is set in the flowspec (s_flowspec) field of the sender in the ASP header. In this manner, a VC in the downstream direction which is opposite to the direction in which the ASP message flows is constructed by the edge router 46, the backbone routers 45, 44, and 43, and the edge router 42, in this order.

Figure 21:
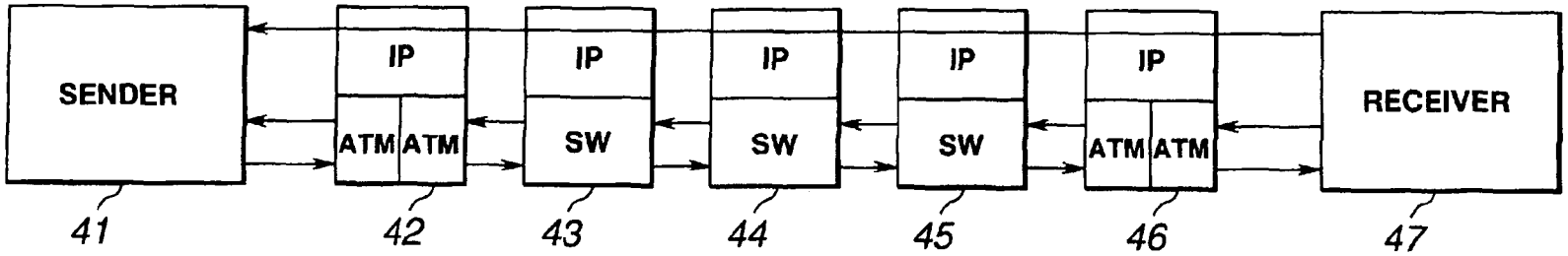
FIG. 21 is a view explaining the procedure of constructing a VC in case where the receiver knows QoS required for bi-directional communication.

FIG. 21 shows the procedure in which a VC is constructed in case where the receiver knows QoS required for bi-directional communication. In this case, the bi-directional VC is prepared by one resource reservation request message.

That is, the receiver 47 sets, for example, a value of 1 which indicates that a VC is to be constructed bi-directionally, in the flag (flags) field in the ASP header. Further, the receiver 47 sets a value corresponding to the band width of the VC in the downstream direction, in the flowspec (s_flowspec) field of the sender in the ASP header, and also sets a value corresponding to the band width of the VC in the upstream direction, in the flowspec (r_flowspec) field of the receiver. Then, the receiver 47 sends the ASP message containing the ASP header to the sender 41. In this manner, at first, in the edge router 46, a VC in the upstream direction with a band width set in the flowspec (r_flowspec) of the receiver and a VC in the downstream direction with a band width set in the flowspec (s_flowspec) field of the sender are constructed. Next, in the backbone routers 45, 44, and 43, and the edge router 42, a VC in the upstream direction with a band width set in the flowspec (r_flowspec) field and a VC in the downstream direction with a band width set in the flowspec (s_flowspec) field of the sender are respectively constructed.

Thus, the ASP can construct a VC in various methods, and a selection among these methods can be made from an upper layer. It is therefore possible to realize set-up suitable for applications.

The above explanation has been made with respect the ASP which integrates ATM and IP and sets up a VC on demand without using ATM signaling.

In addition to the above, explanation will now be made of a mechanism for dynamically changing the relationship between the VC (resource) and the flow with use of the function of the ASP. At present, data with respect to a VC sinks from an edge router to a receiver, i.e., the data cuts through. Therefore, data with respct to a VC passes through the switches of a plurality of backbone routers, and directly passes through a VC of ATM to the edge router in the receiver side.

Taken into consideration that the data sinks at the edge router, if an ASP message is issued so as to effect feed-back thereon, it is possible to shift an existing communication using another VC can be shifted to a VC which has already been prepared. That is, during communication, the VC can be changed and the intermediate route or the like can be dynamically changed, at the entrance to the backbone.

In the following, explanation will be made of advantages obtained by assembling this mechanism into the ASP. This mechanism is not limited to the ASP but can be effectively used when linked with RSVP or the like.

For example, in case of ATM signaling, it is difficult to change the route after set-up of the VC is once completed. This is because the VC must be extended in the manner of end-to-end. Meanwhile, the RSVP has advantages in that it is robust and is applicable to the environment. At last, according to the presently existing IP routing, the route is changed, and therefore, the RSVP is not suitable for real-time communication. In order to solve this problem, the RSVP introduces route pinning so that setting can be made so as not to permit a change based on routing, with respect to a clearly reserved route.

By adopting this method, the route can be easily changed even if communication continues. Although a route is not changed in normal cases, a change of a route can be easily permitted by introducing QoS routing.

Also, according to this method, the flow received just during communication can be collected into a predetermined VC, so that resources such as VCI and the like can be saved.

Further, according to this method, reservations for a certain organization, application, or the like can be collected.

Also, according to this method, a plurality of communication routes can be prepared for a predetermined destination, and route/resource of another session can be collected in case where communication such as a new session or the like requires a certain amount of resource capacity.

In addition, according to this method, the resource reservation status of a session during communication can be dynamically changed.

Although attention is here particularly paid to an edge router, this mechanism can be realized in a backbone router. As an equipment, after preparation is made for remapping the flow to which attention is paid, this switching is carried out at a high speed by the edge router. Although equivalent operation can be made with use of a backbone router, it is difficult to collect information required therefor, and besides, it is undesirable to complicate the function of the backbone router itself by providing this kind of mechanism.

In case of an edge router, the number of terminals or home routers collected in the end side can be grasped to some extent, and therefore, suitable routing corresponding to the number can be performed, so that collection of information is more limited and simplified than a backbone router.

In this method, it should be noted that the flowing data is influenced by operation of the edge. At first, there is a possibility that loss may be caused in the data to be transmitted by switching the VC in the sender side.

Also, at the edge in the receiver side, data is transmitted temporarily from two VCs, so that the receiver side might receive reiteratively the data.

In this respect, to guarantee the correctness of data, it is desirable to use a transport protocol having high reliability.

Although explanation has been made with respect to the case of reserving a VC in the embodiment described above, the present invention can be applied to the case of reserving another resource such as UPC (Usage Parameter Control) or the like.

In this example, a server or a client terminal are specified by combining the IP address with the socket port number. However, another different method can be used.

As a medium for providing a computer program for executing processing as described above, it is possible to use a communication medium such as a network, a satellite, or the like, in addition to a recording medium such as a magnetic disk, a CD-ROM, a solid memory, or the like.

According to the information receiving apparatus and method, the information providing apparatus, and the information communication system of the present invention, processing necessary for resource reservation and releaser of the resource reservation is carried out when a service is selected. Therefore, a user can carry out reservation of a resource or release thereof without consciousness.

What is claimed is:

[1. An information receiving apparatus which is connected to an information providing apparatus by forming a connection in a communication network and which receives content information from the information providing apparatus through the connection, comprising:

input means for inputting a command based on an operation by a user;

communication means for making communication through the communication network;

control means for controlling the communication means so as to output an instruction signal, based on the command inputted through the input means; and display means for displaying the content information received by the communication means, characterized in that if a switching instruction which indicates that second content information should be received in place of first content information is inputted as the command to the communication means when the communication means is receiving the first content information through the connection formed in the communication network, the control means makes control so as to output a disconnection instruction for disconnecting the connection for transmitting the first content information, which is formed in the communication network connecting the communication means and the information providing apparatus, and a formation instruction for forming the connection for transmitting the second content information, which is formed in the communication network connecting the communication means and the information providing apparatus, further characterized in that prior to formation of the connection, the control means controls makes control such that the communication means outputs a reservation instruction signal for making reservation of a communication band resource of the communication network, as the instruction signal, and further characterized in that if the control means recognizes the communication band resource which is necessary for the content information to be received, the control means makes control such that the communication means outputs the reservation instruction signal containing resource information indicating the communication band resource, or if the control means does not recognize the communication band resource which is necessary for the content information to be received, the control means makes control such that the communication means outputs the reservation instruction signal without containing the resource information indicating the communication band resource.]

[2. An apparatus according to claim 1, further comprising storage means for storing predetermined resource information used for reserving a communication band resource necessary for transmitting the content information, characterized in that the control means generates the formation instruction containing the predetermined resource information stored in the storage means, when forming the connection.]

[3. An apparatus according to claim 2, characterized in that the storage means stores information used for reserving a communication band resource for transmitting the content information as the predetermined resource information.]

[4. An information receiving apparatus which is connected to an information providing apparatus by forming a connection in a communication network and which receives content information from the information providing apparatus through the connection, comprising:

input means for inputting a command based on an operation by a user;

communication means for making communication through the communication network;

control means for controlling the communication means so as to output an instruction signal, based on the command inputted through the input means; and display means for displaying the content information received by the communication means, characterized in that if a switching instruction which indicates that second content information should be received in place of first content information is inputted as the command to the communication means when the communication means is receiving the first content information through the connection formed in the communication network, the control means makes control so as to output a disconnection instruction for disconnecting the connection for transmitting the first content information, which is formed in the communication network connecting the communication means and the information providing apparatus, and a formation instruction for forming the connection for transmitting the second content information, which is formed in the communication network connecting the communication means and the information providing apparatus, further characterized in that after outputting the disconnection instruction for instructing disconnection of the connection for content information presently received at a previously set time interval, the control means makes control so as to output the information instruction for instructing formation of the connection for transmitting content information according to a previously set order.]

[5. An information receiving method in which a connection is made in a communication network to an information providing apparatus and content information is received from the information providing apparatus through the connection, comprising:

an input step of inputting a command based on an operation by a user;

a communication step of making communication through the communication network;

a control step of controlling the communication step so as to output an instruction signal, based on the command inputted through the input step; and a display step of displaying the content information received through the communication step, characterized in that if a switching command which instructs that second content information should be received in place of first content information is inputted as the command in the communication step, based on only one operation by a user in the input step, when the first content information is being received in the communication step through the connection formed in the communication network, the control step makes control so as to output a disconnection instruction for instructing disconnection of the connection for transmitting the first content information, which if formed in the communication network connected with the information providing apparatus by the communication step, and a formation instruction for instructing formation of the connection for transmitting the second content information, which is formed in the communication network connected with the information providing apparatus in the communication step, further characterized in that prior to formation of the connection, the control step makes control such that a reservation instruction signal for making reservation of a communication band resource of the communication network is outputted as the instruction signal in the communication step, and further characterized in that if the communication band resource which is necessary for the content information to be received is recognized in the control step, the control step makes control such that the reservation instruction signal containing resource information indicating the communication band resource is outputted in the communication step, or if the communication band resource which is necessary for the content information to be received is not recognized in the control step, the control step makes control such that the reservation instruction signal without containing resource information indicating the communication band resource is outputted in the communication step.]

[6. A method according to claim 5, further comprising a storage step of storing predetermined resource information used for reserving a communication band resource necessary for transmitting the content information, characterized in that the control step generates the formation instruction containing the predetermined resource information stored in the storage step, when forming the connection.]

[7. A method according to claim 5, characterized in that information used for reserving a communication band resource for transmitting the content information is stored as the predetermined resource information in the storage step.]

[8. An information receiving method in which a connection is made in a communication network to an information providing apparatus and content information is received from the information providing apparatus through the connection, comprising:

an input step of inputting a command based on an operation by a user;

a communication step of making communication through the communication network;

a control step of controlling the communication step so as to output an instruction signal, based on the command inputted through the input step; and a display step of displaying the content information received through the communication step, characterized in that if a switching command which instructs that second content information should be received in place of first content information is inputted as the command in the communication step, based on only one operation by a user in the input step, when the first content information is being received in the communication step through the connection formed in the communication network, the control step makes control so as to output a disconnection instruction for instructing disconnection of the connection for transmitting the first content information, which if formed in the communication network connected with the information providing apparatus by the communication step, and a formation instruction for instructing formation of the connection for transmitting the second content information, which is formed in the communication network connected with the information providing apparatus in the communication step, further characterized in that after outputting the disconnection instruction for instructing disconnection of the connection for content information presently received, at a previously set time interval, the control step makes control so as to output the formation instruction for instructing formation of the connection for transmitting content information according to a previously set order.]

[9. An information providing apparatus which is connected to an information receiving apparatus through a communication network and which provides the information receiving apparatus with content information, with use of a communication band resource of the communication network which is reserved prior to providing of the content information, comprising:

communication means for making communication through the communication network;

storage means for storing the content information;

direction means for detecting whether or not resource information indicating the communication band resource is contained in an instruction signal, when the communication means receives the instruction signal from the information receiving apparatus; and control means for outputting a band reservation command for reserving the communication band resource, based on a detection result from the detection means, and for making control to make a selection from a first mode in which the communication means is controlled so as to output the content information to the information receiving apparatus, and a second mode in which the communication means is controlled so as to output the content information with use of the communication band resource indicated by the resource information, characterized in that the control means selects the first mode if the instruction signal does not contain the resource information, or the second mode if the instruction signal contains the resource information.]

[10. An information communication system comprising an information providing apparatus and an information receiving apparatus connected to a communication network, in which the information providing apparatus and the information receiving apparatus exchanges content information through communication with use of a communication band resource of the communication network which is reserved prior to communication of the content information, characterized in that the information providing apparatus includes providing communication means for making communication through the communication network, storage means for storing the content information, and providing control means for controlling the providing communication means so as to output the content information, the information receiving apparatus includes input means for inputting a command based on an operation by a user, receiving communication means for making communication through the communication network, receiving control means for controlling the receiving communication means so as to output an instruction signal based on the command inputted through the input means, and display means for displaying the content information received by the communication means, and if a switching instruction which indicates that second content information should be received in place of first content information is inputted as the command to the receiving communication means when the receiving communication means is receiving the first content information through the connection formed in the communication network, the receiving control means makes control so as to output a disconnection instruction for disconnecting the connection for transmitting the first content information, which is formed in the communication network connecting the receiving communication means and the information providing apparatus, and a formation instruction for forming the connection for transmitting the second content information, which is formed in the communication network connecting the receiving communication means and the information providing apparatus, and characterized in that the information providing apparatus further includes detection means for detecting whether or not resource information indicating the communication band resource is contained in an instruction signal, when the receiving communication means receives the instruction signal from the information receiving apparatus, and based on a detection result from the detection means, the providing control means makes control so as to select a first mode in which a band reservation command for reserving the communication band resource is outputted and the communication means is controlled so as to output the content information to the information receiving apparatus, if the instruction signal does not contain the resource information, or a second mode in which the communication means is controlled so as to output the content information with use of the communication band resource indicated by the resource information, if the instruction signal contains the resource information.]

[11. A system according to claim 10, further comprising a relay apparatus between the information providing apparatus and the information receiving apparatus, characterized in that the relay apparatus reserves the band communication resource based on an instruction from the providing control means and the receiving control means.]

[12. A system according to claim 11, characterized in that the relay apparatus reserves the communication resource used for communication from the information providing apparatus to the information receiving apparatus.]

*13. An information receiving method in which a connection is made in a communication network to an information providing apparatus and a content is received from the information providing apparatus through the connection, the method comprising:*

*initiating a client interface program;*

*receiving data including a first program title that is an Internet video on demand program title, a unicast address associated with the first program title, a second program title, and a multicast address associated with the second program title;*

*selecting one of the first program title or the second program title; and*

*receiving a content of the selected program title from the information providing apparatus associated with one of the unicast address and the multicast address.*

*14. The method of claim 13, wherein the second program title is an Internet television program title.*

*15. The method of claim 13, wherein the data further includes first and second service numbers corresponding to the first and second program titles respectively.*

*16. The method of claim 13, wherein the data further includes first and second transfer rates corresponding to the first and second program titles respectively.*

*17. The method of claim 14, further comprising simultaneously displaying the first and second program titles on a screen.*

*18. An information receiving method in which a connection is made in a communication network to an information providing apparatus and a content is received from the information providing apparatus through the connection, the method comprising:*

*(a) receiving data including one or more program titles that are Internet video on demand program titles, and one or more IP addresses associated with the Internet video on demand program titles, at least one of the one or more IP addresses is a multicast address;*

*(b) automatically forming a connection for receiving a video content of one of the Internet video on demand program titles from an information providing apparatus associated with one of the IP addresses;*

*(c) automatically disconnecting the connection; and*

*(d) repeating steps (b) and (c) until receiving a user input which interrupts step (b).*

*19. The method of claim 18, wherein the video content is an Internet television program.*

*20. An information receiving method in which a connection is made in a communication network to an information providing apparatus and a content is received from the information providing apparatus through the connection, the method comprising:*

*initiating a client interface program, wherein the client interface program causes a client hardware to display at least a first service name and a second service name on a screen, wherein the first service name is associated with a network address from which Internet video on demand is provided through a unicast and the second service name is associated with a multicast address;*

*receiving a user selection to select at least one of the first service name or the second service name; and*

*receiving a content of the selected one of the first or second service names.*

*21. The method of claim 20, wherein the content is displayed on the screen simultaneously with the first and second service names.*

* * * * *